(12) United States Patent
Kuzume et al.

(10) Patent No.: US 12,097,688 B2
(45) Date of Patent: Sep. 24, 2024

(54) MULTILAYER STRUCTURE, METHOD FOR PRODUCING SAME, PACKAGING MATERIAL AND PRODUCT INCLUDING SAME, AND PROTECTIVE SHEET FOR ELECTRONIC DEVICE

(71) Applicant: KURARAY CO., LTD., Okayama (JP)

(72) Inventors: Shuhei Kuzume, Okayama (JP); Ryoichi Sasaki, Okayama (JP); Yasushi Morihara, Okayama (JP)

(73) Assignee: KURARAY CO., LTD., Okayama (JP)

( * ) Notice: Subject to any disclaimer, the term of this patent is extended or adjusted under 35 U.S.C. 154(b) by 0 days.

(21) Appl. No.: 17/782,061

(22) PCT Filed: Dec. 4, 2020

(86) PCT No.: PCT/JP2020/045348
§ 371 (c)(1),
(2) Date: Jun. 2, 2022

(87) PCT Pub. No.: WO2021/112252
PCT Pub. Date: Oct. 6, 2021

(65) Prior Publication Data
US 2023/0017050 A1    Jan. 19, 2023

(30) Foreign Application Priority Data

Dec. 6, 2019  (JP) ................. 2019-221263

(51) Int. Cl.
| | |
|---|---|
| B32B 27/30 | (2006.01) |
| B05D 1/36 | (2006.01) |
| B05D 7/00 | (2006.01) |
| B05D 7/24 | (2006.01) |
| B32B 7/10 | (2006.01) |
| B32B 15/082 | (2006.01) |
| B32B 15/09 | (2006.01) |
| B32B 15/20 | (2006.01) |
| B32B 27/36 | (2006.01) |
| B65D 81/38 | (2006.01) |
| C09D 129/04 | (2006.01) |
| C09D 167/02 | (2006.01) |
| C09D 167/03 | (2006.01) |

(52) U.S. Cl.
CPC .............. *B32B 27/306* (2013.01); *B32B 7/10* (2013.01); *B32B 15/082* (2013.01); *B32B 15/09* (2013.01); *B32B 15/20* (2013.01); *B32B 27/36* (2013.01); *B65D 81/38* (2013.01); *B05D 1/36* (2013.01); *B05D 7/24* (2013.01); *B05D 7/544* (2013.01); *B32B 2307/7242* (2013.01); *B32B 2307/7244* (2013.01); *B32B 2367/00* (2013.01); *B32B 2439/06* (2013.01); *B32B 2439/70* (2013.01); *B32B 2439/80* (2013.01); *B32B 2457/00* (2013.01); *C09D 129/04* (2013.01); *C09D 167/02* (2013.01); *C09D 167/03* (2013.01)

(58) Field of Classification Search
None
See application file for complete search history.

(56) References Cited

U.S. PATENT DOCUMENTS

| | | | |
|---|---|---|---|
| 6,420,004 B1 | 7/2002 | Veyrat et al. | |
| 6,436,544 B1* | 8/2002 | Veyrat | B32B 27/36 427/407.1 |
| 7,303,797 B1* | 12/2007 | Barsotti | C08J 7/048 428/323 |
| 2002/0028295 A1* | 3/2002 | Veyrat | B32B 27/306 427/402 |
| 2006/0227439 A1* | 10/2006 | Taki | C08J 7/0427 359/883 |
| 2009/0022981 A1* | 1/2009 | Yoshida | C08J 7/043 428/336 |
| 2009/0098395 A1* | 4/2009 | Lu | C09D 127/08 427/407.1 |
| 2013/0034674 A1 | 2/2013 | Yoshida et al. | |
| 2014/0333999 A1* | 11/2014 | Shim | C08G 18/4676 523/435 |

(Continued)

FOREIGN PATENT DOCUMENTS

| | | | |
|---|---|---|---|
| JP | H10-156996 A | | 6/1998 |
| JP | 2000-071395 A | | 3/2000 |
| JP | 2000-302960 A | * | 10/2000 |
| JP | 2001-510110 A | | 7/2001 |
| JP | 2003-128888 A | | 5/2003 |
| JP | 2013-199066 A | | 10/2013 |
| JP | 2016-055560 A | | 4/2016 |

(Continued)

OTHER PUBLICATIONS

International Search Report issued in corresponding International Patent Application No. PCT/JP2020/045348 dated Feb. 22, 2021.

*Primary Examiner* — Vivian Chen
(74) *Attorney, Agent, or Firm* — Morgan, Lewis & Bockius LLP

(57) ABSTRACT

The present invention provides a multilayer structure that has excellent gas barrier properties and an excellent peel strength between a base and a gas barrier layer after retorting, and that can retain a good appearance with no delamination even after retorting under stress. The present invention also provides packaging materials and products including such a multilayer structure. The present invention relates to a multilayer structure comprising a base (X), a layer (Z) stacked on the base (X), and a layer (Y) stacked on the layer (Z), the layer (Y) containing a reaction product (D) of an aluminum-containing metal oxide (A) and an inorganic phosphorus compound (BI), the layer (Z) containing a polyvinyl alcohol resin (C) and a polyester resin (L).

20 Claims, No Drawings

(56) References Cited

U.S. PATENT DOCUMENTS

| | | |
|---|---|---|
| 2017/0096538 A1 | 4/2017 | Sasaki et al. |
| 2018/0015713 A1 | 1/2018 | Inubushi et al. |

FOREIGN PATENT DOCUMENTS

| | | |
|---|---|---|
| JP | 2016-124272 A | 7/2016 |
| JP | 2018-001574 A | 1/2018 |
| WO | 2011/122036 A1 | 10/2011 |
| WO | 2015/141226 A1 | 9/2015 |
| WO | 2016/103719 A1 | 6/2016 |
| WO | 2019/103069 A1 | 5/2019 |
| WO | WO 2019/142615 A * | 7/2019 |

* cited by examiner

MULTILAYER STRUCTURE, METHOD FOR PRODUCING SAME, PACKAGING MATERIAL AND PRODUCT INCLUDING SAME, AND PROTECTIVE SHEET FOR ELECTRONIC DEVICE

TECHNICAL FIELD

The present invention relates to a multilayer structure, a method for producing the multilayer structure, a packaging material and product including the multilayer structure, and a protective sheet for electronic devices.

BACKGROUND ART

Multilayer structures in which a gas barrier layer containing aluminum or aluminum oxide as a component is formed on a plastic film have been conventionally well-known. Such multilayer structures are used as packaging materials for protecting articles (such as foods) which are susceptible to quality change induced by oxygen. There are cases where the gas barrier layer is formed on a plastic film by a dry process such as physical vapor deposition or chemical vapor deposition, or formed by coating a plastic with a reaction product of aluminum oxide particles and a phosphorus compound. The multilayer structure is also used as a component of an electronic-device protective sheet, which is required to have gas barrier properties and water vapor barrier properties to protect the features of an electronic device.

Patent Literature 1 describes a composite structure having a transparent gas barrier layer comprising a reaction product of aluminum oxide particles and a phosphorus compound. This patent document also describes a method for forming the gas barrier layer, in which a coating liquid containing aluminum oxide particles and a phosphorus compound is applied onto a plastic film, then dried and heat-treated.

In Patent Literature 2, an anchor coat layer including a coating agent composed primarily of a mixture of an aqueous dispersion having a polyurethane backbone and a solvent-base isocyanate curing agent is provided between a base layer and a deposition layer. It is stated in this patent document that a decrease of barrier properties after storage under high temperature and high humidity can be reduced by the provision of the anchor coat layer.

CITATION LIST

Patent Literature

Patent Literature 1: WO2011/122036
Patent Literature 2: JP 2013-199066 A

SUMMARY OF INVENTION

Technical Problem

However, it was found that there are cases where delamination occurs between the base and the gas barrier layer, and appearance defect results when a packaging material including the conventional multilayer structure is subjected to retorting under stress. Previous studies of configurations directed to reduce the occurrence of appearance defect after retorting under stress revealed that there are cases where the peel strength between the base and the gas barrier layer decreases. A decrease of peel strength can easily lead to delamination between the base and the gas barrier layer when, for example, external forces are exerted on the inner and outer surfaces of a packaging container. This may result in appearance defects or a decrease of gas barrier properties.

It is accordingly an object of the present invention to provide a multilayer structure that has excellent gas barrier properties and an excellent peel strength between a base and a gas barrier layer after retorting, and that can retain a good appearance with no delamination even after retorting under stress. Another object of the present invention is to provide packaging materials and products including such a multilayer structure. It is yet another object of the present invention to provide an electronic-device protective sheet that can retain a good appearance with no delamination even after long use or after a high-temperature high-humidity acceleration test simulating long use. In the following, the situation where a good appearance is maintained after retorting under stress may be described as "retort resistance under stress".

Solution to Problem

Specifically, the present invention can achieve the foregoing objects with the following.

[1] A multilayer structure comprising a base (X), a layer (Z) stacked on the base (X), and a layer (Y) stacked on the layer (Z),
the layer (Y) containing a reaction product (D) of an aluminum-containing metal oxide (A) (hereinafter, also referred to simply as "metal oxide (A)") and an inorganic phosphorus compound (BI),
the layer (Z) containing a polyvinyl alcohol resin (C) (hereinafter, also referred to simply as "PVA resin (C)") and a polyester resin (L).

[2] The multilayer structure according to [1], wherein the polyester resin (L) is a polyester resin having a carboxyl group.

[3] The multilayer structure according to [1] or [2], wherein a mass ratio(C)/(L) of the PVA resin (C) and the polyester resin (L) is 1/99 to 50/50.

[4] The multilayer structure according to any one of [1] to [3], wherein the PVA resin (C) has a viscosity in a 4 mass % aqueous solution of 1 mPa·s to 100 mPa·s as measured in accordance with JIS K 6726 (1994).

[5] The multilayer structure according to any one of [1] to [4], wherein the layer (Z) has a thickness ranging from 1 to 100 nm.

[6] The multilayer structure according to any one of [1] to [5], wherein the base (X) and the layer (Y) have an interlayer peel strength of 100 gf/15 mm or more as measured while dropping water on a delaminating interface after 125° C., 30-minute retorting.

[7] A method for producing a multilayer structure of any one of [1] to [6], comprising:
a step (I) of applying a coating liquid (R) containing a PVA resin (C), a polyester resin (La), and a solvent to a base (X), and removing the solvent to form a layer (Z);
a step (II) of applying a coating liquid (S) containing an aluminum-containing metal oxide (A), an inorganic phosphorus compound (BI), and a solvent to the layer (Z), and removing the solvent to form a precursor of layer (Y); and
a step (III) of heat treating the precursor of layer (Y) to form a layer (Y).

[8] A packaging material comprising a multilayer structure of any one of [1] to [6].

[9] The packaging material according to [8], which is a vertical form-fill-seal bag, a vacuum packaging bag, a pouch, a laminated tube container, an infusion bag, a paper container, a strip tape, a container lid, or an in-mold labeled container.

[10] A product using a packaging material of [8] or [9] in at least a part of the product.

[11] The product according to [10], wherein
the product comprises contents in an interior thereof,
the contents are a core material,
the interior of the product has a reduced pressure, and
the product functions as a vacuum insulator.

[12] A protective sheet for electronic devices, comprising a multilayer structure of any one of [1] to [6].

[13] An electronic device comprising a protective sheet of [12].

Advantageous Effects of Invention

According to the present invention, a multilayer structure can be provided that has excellent gas barrier properties and an excellent peel strength between a base and a gas barrier layer after retorting, and that shows good retort resistance under stress. Packaging materials and products including such a multilayer structure can also be provided. The present invention can also provide an electronic-device protective sheet that can retain a good appearance with no delamination even after long use or after a high-temperature high-humidity acceleration test simulating long use.

A multilayer structure of the present invention comprises a base (X), a layer (Z) stacked on the base (X), and a layer (Y) stacked on the layer (Z),
the layer (Y) containing a reaction product (D) of an aluminum-containing metal oxide (A) and an inorganic phosphorus compound (BI),
the layer (Z) containing a PVA resin (C) and a polyester resin (L).

Base (X)

The material of the base (X) is not particularly limited, and a base made of any of various materials can be used. Examples of the material of the base (X) include resins such as thermoplastic resins and thermosetting resins; fiber assemblies such as fabrics and paper; wood; glass; metals; and metal oxides. The base (X) preferably comprises a thermoplastic resin and a fiber assembly, and more preferably comprises a thermoplastic resin. The form of the base (X) is not particularly limited. The base (X) may be a laminar base such as a film or sheet. The base (X) is preferably one comprising at least one selected from the group consisting of a thermoplastic resin film, a paper layer, and an inorganic deposition layer (X'), more preferably one comprising a thermoplastic resin film. Even more preferably, the base (X) is a thermoplastic resin film.

Examples of thermoplastic resins that may be used in the base (X) include: polyolefin resins such as polyethylene and polypropylene; polyester resins such as polyethylene terephthalate (PET), polyethylene-2,6-naphthalate, polybutylene terephthalate, and copolymers thereof; polyamide resins such as nylon-6, nylon-66, and nylon-12; hydroxy group-containing polymers such as polyvinyl alcohol and ethylene-vinyl alcohol copolymer; polystyrene; poly(meth)acrylic acid esters; polyacrylonitrile; polyvinyl acetate; polycarbonate; polyarylate; regenerated cellulose; polyimide; polyetherimide; polysulfone; polyethersulfone; polyether ether ketone; and ionomer resins. The thermoplastic resin used for the base (X) is preferably at least one selected from the group consisting of polyethylene, polypropylene, polyethylene terephthalate, nylon-6, and nylon-66. More preferably, the thermoplastic resin is polyethylene terephthalate.

When a thermoplastic resin film is used as the base (X), the base (X) may be an oriented film or non-oriented film. In terms of high suitability for processes (such as printing and lamination) of the resulting multilayer structure, an oriented film, particularly a biaxially oriented film, is preferred. The biaxially oriented film may be a biaxially oriented film produced by any one method selected from simultaneous biaxial stretching, sequential biaxial stretching, and tubular stretching.

Examples of paper that may be used in the base (X) include kraft paper, high-quality paper, simili paper, glassine paper, parchment paper, synthetic paper, white paperboard, manila board, milk carton board, cup paper, and ivory paper. By using paper for the base (X), a multilayer structure for paper container can be obtained.

When the base (X) is in the form of a layer, the thickness of the base (X) is preferably 1 to 1,000 µm, more preferably 5 to 500 µm, and even more preferably 9 to 200 µm, in terms of high mechanical strength and good processability of the resulting multilayer structure.

Inorganic Deposition Layer (X')

The inorganic deposition layer (X') is typically a layer having barrier properties against oxygen and water vapor, and is preferably a layer having transparency. The inorganic deposition layer (X') can be formed by vapor deposition of inorganic material.

Examples of the inorganic material include metals (for example, aluminum), metal oxides (for example, silicon oxide, aluminum oxide), metal nitrides (for example, silicon nitride), metal oxynitrides (for example, silicon oxynitride), and metal carbonitrides (for example, silicon carbonitride). In view of excellence of barrier properties, the inorganic deposition layer (X') is preferably one formed of aluminum oxide, silicon oxide, magnesium oxide, or silicon nitride.

The method of forming the inorganic deposition layer (X') is not particularly limited, and the inorganic deposition layer (X') can be formed by using, for example, a physical vapor deposition process such as vacuum vapor deposition (for example, resistance heating vapor deposition, electron beam deposition, molecular beam epitaxy, or ion plating), or sputtering (for example, dual magnetron sputtering); or a chemical vapor deposition process as thermochemical vapor deposition (for example, catalytic chemical vapor deposition), photochemical vapor deposition, plasma chemical vapor deposition (for example, a capacitively coupled plasma process, an inductively coupled plasma process, a surface wave plasma process, or an electron cyclotron resonance plasma process), atomic layer deposition, or organometallic vapor deposition.

The thickness of inorganic deposition layer (X') is preferably 0.002 to 0.5 am, more preferably 0.005 to 0.2 µm, even more preferably 0.01 to 0.1 µm, though the thickness depends on the type of components constituting the inorganic deposition layer. Within these ranges, the inorganic deposition layer (X') can have a selected thickness that provides good barrier properties and good mechanical characteristics to the multilayer structure. When the inorganic deposition layer (X') has a thickness of at least 0.002 µm, the inorganic deposition layer (X') tends to have good barrier properties against oxygen and water vapor. When the thickness of the inorganic deposition layer (X') is 0.5 µm or less, the inorganic deposition layer (X') tends to maintain barrier properties after bending.

Layer (Z)

The layer (Z) is a layer stacked on the base (X), and comprises a PVA resin (C) and a polyester resin (L). The presence of the layer (Z) between the base (X) and the layer (Y) improves the peel strength between the layers of a multilayer structure of the present invention, and provides good retort resistance under stress. In view of peel strength, it is preferable that the layer (Z) be directly stacked on the base (X).

Polyvinyl Alcohol Resin (C)

By the presence of the PVA resin (C) in the layer (Z), the retort resistance under stress tends to improve. A decrease of gas barrier properties after retorting due to polyester resin (L) (described later) also tends to be reduced by the presence of the PVA resin (C). Examples of the PVA resin (C) include polyvinyl alcohol (hereinafter also referred to simply as "PVA") resins, and ethylene-vinyl alcohol copolymer (hereinafter, also referred to simply as "EVOH") resins. In view of providing good adhesion between base (X) and layer (Y), the PVA resin (C) is preferably a PVA resin. Examples of the PVA resin include PVA resins obtained through saponification after sole polymerization of a vinyl ester, and modified PVA resins having other modified groups. The modified PVA resins may be PVA resins modified via copolymerization, or may be PVA resins modified after polymerization reaction. Examples of the EVOH resins include EVOH resins obtained through saponification after copolymerization of a vinyl ester and ethylene, and modified EVOH resins having other modified groups. The modified EVOH resins may be EVOH resins modified via copolymerization, or may be EVOH resins modified after polymerization reaction. The PVA resin (C) may be used alone, or two or more thereof may be used as a mixture. In this specification, EVOH resins have an ethylene unit content of 20 mol % or more, and PVA resins have an ethylene unit content of less than 20 mol %.

The PVA resin has a degree of saponification of preferably 40 mol % or more, more preferably 50 mol % or more, even more preferably 70 mol % or more. The PVA resin has a degree of saponification of preferably 99.9 mol % or less, and the degree of saponification may be 99.0 mol % or less, or 98 mol % or less. The adhesion between base (X) and layer (Y) tends to improve when the degree of saponification is 40 mol % or more. Preparation of a coating liquid (R) (described later) tends to be easier when the degree of saponification is 99.9 mol % or less.

The EVOH resin has a degree of saponification of preferably 70 mol % or more, more preferably 80 mol % or more, even more preferably 90 mol % or more. The EVOH resin may have a degree of saponification of 99.9 mol % or less. The adhesion between base (X) and layer (Y) tends to improve when the degree of saponification is adjusted to fall in these ranges.

The EVOH resin may have an ethylene unit content of 20 mol % to 60 mol %. The ethylene unit content of EVOH resin is preferably 40 mol % or less, more preferably 30 mol % or less. When the ethylene unit content of EVOH resin is 60 mol % or less, the hydrophilicity improves, and the adhesion between base (X) and layer (Y) tends to improve.

When the PVA resin (C) has a modified group, examples of the modified group include a silanol group, a thiol group, an aldehyde group, a carboxy group, an acetoacetyl group, a sulfonic acid group, a nitrile group, and an amino group. Preferably, the PVA resin (C) has a silanol group. By the presence of a modified group, the adhesion between base (X) and layer (Y) can improve as a result of chemical bonding. When the PVA resin has a modified group such as above, the content of the modified group may be 20 mol % or less, 10 mol % or less, 5 mol % or less, or 1 mol % or less. In other embodiments, the modified group may be absent (0 mol %).

When the PVA resin (C) is modified via copolymerization, examples of other monomers used for copolymerization with a vinyl ester include: olefins such as ethylene, propylene, isobutylene, α-octene, α-dodecene, and α-octadecene; hydroxyl group-containing α-olefins such as 3-buten-1-ol, 4-penten-1-ol, and 5-hexen-1-ol, and derivatives thereof such as acylated products of these; unsaturated acids such as acrylic acid, methacrylic acid, crotonic acid, maleic acid, maleic anhydride, itaconic acid, and undecylenic acid, and salts, monoesters, or dialkyl esters of these; nitriles such as acrylonitrile and methacrylonitrile; amides such as diacetoneacrylamide, acrylamide, and methacrylamide; olefin sulfonic acids such as ethylenesulfonic acid, allylsulfonic acid, and methallylsulfonic acid, or salts thereof; vinyl compounds such as alkyl vinyl ethers, dimethylallyl vinyl ketone, N-vinylpyrrolidone, vinyl chloride, vinylethylene carbonate, 2,2-dialkyl-4-vinyl-1,3-dioxnlan, glycerin monoallyl ether, and 3,4-diacetoxy-1-butene; substituted vinyl acetates such as isopropenyl acetate, and 1-methoxyvinyl acetate; vinylidene chloride; 1,4-diacetoxy-2-butene; and vinylene carbonate. When the PVA resin (C) contains other monomers such as above, the content of other monomers may be less than 20 mol %, 10 mol % or less, 5 mol % or less, or 3 mol % or less.

The PVA resin (C) has a viscosity at 20° C. of preferably 1 mPa·s to 100 mPa·s, more preferably 3 mPa·s to 90 mPa·s, even more preferably 5 mPa·s to 80 mPa·s as measured in a 4 mass % aqueous solution of PVA resin (C) according to JIS K 6726 (1994). With the viscosity of PVA resin (C) confined in these ranges, the layer (Z) can be more easily prepared into a uniform thickness, and the multilayer structure obtained tends to be able to repeatedly exhibit adhesion in a stable fashion.

Polyester Resin (L)

A decrease of peel strength between base (X) and layer (Y) after retorting due to PVA resin (C) tends to be reduced when the layer (Z) contains a polyester resin (L). The polyester resin (L) is a polymer having an ester bond, and can be obtained using a known method, for example, such as polycondensation of a polyvalent carboxylic acid and a polyol. Examples of the polyvalent carboxylic acid include terephthalic acid, isophthalic acid, o-phthalic acid, 2,6-naphthalene dicarboxylic acid, p-phenylene carboxylic acid, 1,4-cyclohexane dicarboxylic acid, succinic acid, glutaric acid, adipic acid, suberic acid, azelaic acid, sebacic acid, dodecanedioic acid, trimellitic acid, pyromellitic acid, and sodium sulfoisophthalate. Examples of the polyol include ethylene glycol, 1,2-propylene glycol, 1,4-butanediol, 1,5-pentanediol, 1,6-hexanediol, neopentyl glycol, diethylene glycol, triethylene glycol, polyethylene glycol, polytetramethylene glycol, 1,4-cyclohexane dimethanol, trimethylolpropane, pentaerythritol, and ethylene oxide adducts of bisphenol A.

In view of affinity to the PVA resin (C), the polyester resin (L) is preferably a polyester resin having a carboxyl group. A polyester resin (La), which is a raw material of polyester resin (L), may be the same polyester resin used as polyester resin (L), or may be a precursor of polyester resin (L). Preferably, the polyester resin (La) is present by being dissolved or dispersed in a solvent such as water or organic solvent. More preferably, the polyester resin (La) is an aqueous dispersion. By being an aqueous dispersion, the polyester resin (La) tends to have improved affinity to the PVA resin (C).

Preferably, the polyester resin (La) is neutralized with a basic compound when being dispersed in aqueous medium. The basic compound is preferably a compound that vaporizes when forming a coating or during bake cure with a curing agent. Examples of such compounds include ammonia, and organic amine compounds having a boiling point of 250° C. or less. Preferred examples of organic amine compounds include triethylamine, N,N-diethylethanolamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyliminobispropylamine, 3-methoxypropylamine, monoethanolamine, diethanolamine, triethanolamine, morpholine, N-methylmorpholine, and N-ethylmorpholine. The amount of basic compound depends on the carboxyl group contained in the polyester resin (L), and the basic compound is used in an amount that enables the polyester resin (L) to at least partially neutralize. Specifically, the amount of basic compound is preferably 0.2 to 1.5 times, more preferably 0.4 to 1.3 times the equivalent of carboxyl group. When the amount of basic compound is less than 0.2 times the equivalent of carboxyl group, the addition of basic compound does not produce the intended effect, whereas serious thickening may occur in the aqueous dispersion of polyester resin when the amount of basic compound is more than 1.5 times the equivalent of carboxyl group.

When the polyester resin (La) is an aqueous dispersion, the acid number of a dispersion of polyester resin (La) is preferably 8 mgKOH/g or more, more preferably 10 mgKOH/g or more. The acid number of a dispersion is preferably 70 mgKOH/g or less, more preferably 50 mgKOH/g or less. With the acid number of a dispersion confined in these ranges, the dispersibility of polyester resin (La) in the coating liquid (R) (described later) improves, and the multilayer structure produced tends to have good retort resistance under stress.

The polyester resin (La) may be a known material. Various aqueous dispersions of polyester resin (La) are commercially available, including, for example, Elitel® KT-0507, KT-8701, KT-8803, KT-9204, KA-5034, KA-3556, KA-1449, KA-5071S, and KZA-1449S (all manufactured by Unitika Ltd.), Vylonal® MD-1200 and Vylonal MD-1480 (both manufactured by Toyobo Co., Ltd.), and Pesresin A-124GP and Pesresin A-684G (manufactured by Takamatsu Oil and Fat Co., Ltd.). The coating liquid (R) (described later) can be prepared by appropriately mixing an aqueous dispersion of polyester resin (La) with a solvent and other components.

The mass ratio ((C)/(L)) of PVA resin (C) and polyester resin (L) is preferably 1/99 or more, more preferably 3/97 or more, even more preferably 5/95 or more. The mass ratio ((C)/(L)) is preferably 50/50 or less, more preferably 45/55 or less, even more preferably 40/60 or less. A good retort resistance under stress tends to occur when the mass ratio ((C)/(L)) is 1/99 or more. A decrease of the peel strength between the base (X) and the layer (Y) after retorting tends to be reduced when the mass ratio ((C)/(L)) is 50/50 or less.

The proportion of PVA resin (C) and polyester resin (L) in the layer (Z) is preferably more than 50 mass %, more preferably 80 mass % or more, even more preferably 90 mass % or more, particularly preferably 95 mass % or more, and may be 99 mass % or more, or 100 mass %. When the PVA resin (C) and polyester resin (L) are more than 50 mass % of the layer (Z), a decrease of the peel strength between the base (X) and the layer (Y) after retorting tends to be reduced even more greatly.

The layer (Z) may comprise an acrylic resin. By containing an acrylic resin, there are cases where the compatibility between PVA resin (C) and polyester resin (L) improves, and there are cases where a decrease of the peel strength between the base (X) and the layer (Y) after retorting tends to be reduced even more greatly. The acrylic resin content in the layer (Z) is preferably less than 50 mass %, more preferably less than 45 mass %, and may be 0 mass % (the resin component is absent).

When the layer (Z) contains an acrylic resin, the mass ratio (acryl/L) of acrylic resin to polyester resin (L) is preferably 20/80 or more, more preferably 30/70 or more. The mass ratio (acryl/L) is preferably 60/40 or less, more preferably 50/50 or less. When the mass ratio (acryl/L) is confined in these ranges, there are cases where a decrease of the peel strength between the base (X) and the layer (Y) after retorting tends to be reduced even more greatly.

The layer (Z) may additionally comprise other components to such an extent that addition of such additional components does not interfere with the effects of the present invention. Examples of additional components that may be contained in the layer (Z) include metal salts of inorganic acids, such as metal carbonates, metal hydrochlorides, metal nitrates, metal hydrogen carbonates, metal sulfates, metal hydrogen sulfates, and metal borates; metal salts of organic acids, such as metal oxalates, metal acetates, metal tartrates, and metal stearates; metal complexes such as a cyclopentadienyl metal complex (e.g., titanocene) and a cyanometal complex (e.g., Prussian blue); layered clay compounds; crosslinkers; polymer compounds other than the PVA resin (C) and polyester resin (L); plasticizers; antioxidants; ultraviolet absorbers; and fire retardants. The content of the additional components in the layer (Z) is preferably less than 50 mass %, more preferably less than 20 mass %, even more preferably less than 10 mass %, particularly preferably less than 5 mass %, and may be 0 mass % (containing no additional components).

The layer (Z) has a thickness of preferably 1 nm or more, more preferably 5 nm or more, even more preferably 10 nm or more. The layer (Z) has a thickness of preferably 100 nm or less, more preferably 70 nm or less, even more preferably 30 nm or less. With the layer (Z) having a thickness confined in the 1 nm to 100 nm range, a high-transparency film tends to be produced that has a good appearance even after retorting under stress. The thickness of layer (Z) can be measured using the method described in the EXAMPLES section below.

Layer (Y)

The layer (Y) is a layer stacked on the layer (Z), and comprises a reaction product (D) of an aluminum-containing metal oxide (A) and an inorganic phosphorus compound (BI). In view of adhesion, it is preferable that the layer (Y) be directly stacked on the layer (Z).

Aluminum-Containing Metal Oxide (A)

The metal atoms constituting the metal oxide (A) (the metal atoms may be collectively referred to as "metal atoms (M)") include at least one metal atom selected from atoms of metals belonging to Groups 2 to 14 of the periodic table, and include at least aluminum atoms. The metal atoms (M) may consist only of aluminum atoms or may include aluminum atoms and other metal atoms. The metal oxide (A) may be a combination of two or more metal oxides (A). Examples of metal atoms other than aluminum atoms include metals in Group 2 of the periodic table, such as magnesium and calcium; metals in Group 12 of the periodic table, such as zinc; metals in Group 13 of the periodic table; metals in Group 14 of the periodic table, such as silicon; and transition metals such as titanium and zirconium. Silicon is categorized herein as a metal, although this element may be classified as a semimetal in other contexts. In view of good ease of handling and providing excellent gas barrier properties to the multilayer structure obtained, the metal atom (M) that can be used with aluminum is preferably at least one selected from the group consisting of titanium and zirconium.

The proportion of aluminum atoms in metal atoms (M) is preferably 50 mol % or more, more preferably 70 mol % or more, even more preferably 90 mol % or more, and may be 95 mol % or more, or 100 mol %. Examples of the metal oxide (A) include metal oxides produced by methods such as liquid-phase synthesis, gas-phase synthesis, and solid grinding.

The metal oxide (A) may be a hydrolytic condensate of a compound (E) containing a metal atom (M) to which a hydrolyzable characteristic group is bonded. Examples of the characteristic group include halogen atoms, $NO_3$, an optionally substituted alkoxy group having 1 to 9 carbon atoms, an optionally substituted aryloxy group having 6 to 9 carbon atoms, an optionally substituted acyloxy group having 2 to 9 carbon atoms, an optionally substituted alkenyloxy group having 3 to 9 carbon atoms, an optionally substituted β-diketonato group having 5 to 15 carbon atoms, and a diacylmethyl group having an optionally substituted acyl group having 1 to 9 carbon atoms. A hydrolytic condensate of compound (E) can be regarded substantially as a metal oxide (A). Accordingly, a hydrolytic condensate of compound (E) is also referred herein to as "metal oxide (A)". That is, the term "metal oxide (A)" as used herein is interchangeable with "hydrolytic condensate of compound (E)", whereas the term "hydrolytic condensate of compound (E)" as used herein is interchangeable with "metal oxide (A)".

Compound (E) Containing Metal Atom (M) to which Hydrolyzable Characteristic Group is Bonded In view of ease of control of a reaction with the inorganic phosphorus compound (BI) and excellence of gas barrier properties of the multilayer structure obtained, the compound (E) preferably comprises a compound (Ea) containing aluminum (described later).

Examples of the compound (Ea) include aluminum chloride, aluminum nitrate, aluminum acetate, tris(2,4-pentanedionato)aluminum, trimethoxyaluminum, triethoxyaluminum, tri-n-propoxyaluminum, triisopropoxyaluminum, tri-n-butoxyaluminum, tri-sec-butoxyaluminum, and tri-tert-butoxyaluminum. Among these, triisopropoxyaluminum and tri-sec-butoxyaluminum are preferred. The compound (E) may be a combination of two or more compounds (Ea).

The compound (E) may comprise a compound (Eb) containing a metal atom (M), excluding aluminum. Examples of the compound (Eb) include titanium compounds such as tetrakis(2,4-pentanedionato)titanium, tetramethoxytitanium, tetraethoxytitanium, tetraisopropoxytitanium, tetra-n-butoxytitanium, and tetrakis(2-ethylhexoxy)titanium; and zirconium compounds such as tetrakis(2,4-pentanedionato)zirconium, tetra-n-propoxyzirconium, and tetra-n-butoxyzirconium. These may be used alone, or two or more thereof may be used in combination.

The proportion of the compound (Ea) in compound (E) is not particularly limited, and is, for example, preferably 80 mol % or more, more preferably 90 mol % or more, even more preferably 95 mol % or more, and may be 100 mol %.

The compound (E) is hydrolyzed, so that at least some of the hydrolyzable characteristic groups of the compound (E) are converted to hydroxy groups. The hydrolysate is then condensed to form a compound in which the metal atoms (M) are linked together via an oxygen atom (O). The repetition of this condensation results in the formation of a compound that can be regarded substantially as a metal oxide. The thus formed metal oxide (A), in general, has hydroxy groups present on its surface.

A compound is categorized herein as the metal oxide (A) when the ratio, [the number of moles of the oxygen atoms (O) bonded only to the metal atoms (M)]/[the number of moles of the metal atoms (M)], is 0.8 or more in the compound. The "oxygen atom (O) bonded only to the metal atom (M)", as defined herein, refers to the oxygen atom (O) in the structure represented by M-O-M, and does not include an oxygen atom that is bonded to both the metal atom (M) and hydrogen atom (H) as is the case for the oxygen atom (O) in the structure represented by M-O—H. The above ratio in the metal oxide (A) is preferably 0.9 or more, more preferably 1.0 or more, and even more preferably 1.1 or more. The upper limit of this ratio is not particularly defined. When the valence of the metal atom (M) is denoted by n, the upper limit is typically expressed as n/2.

In order for the hydrolytic condensation to take place, it is important that the compound (E) has hydrolyzable characteristic groups. When there are no such groups bonded, hydrolytic condensation reaction does not occur or proceeds very slowly, which makes difficult the preparation of the metal oxide (A) intended.

The hydrolytic condensate of the compound (E) may be produced, for example, from a particular starting material by a technique employed in known sol-gel processes. As the starting material there can be used at least one selected from the group consisting of the compound (E), a partial hydrolysate of the compound (E), a complete hydrolysate of the compound (E), a compound formed by partial hydrolytic condensation of the compound (E), and a compound formed by condensation of a part of a complete hydrolysate of the compound (E).

The metal oxide (A) to be mixed with the inorganic phosphorus compound (BI) (described later) is preferably essentially free of phosphorus atoms.

Inorganic Phosphorus Compound (BI)

The inorganic phosphorus compound (BI) has a moiety capable of reacting with the metal oxide (A), and typically has a plurality of, preferably 2 to 20, such moieties. The moieties include a moiety capable of undergoing a condensation reaction with a functional group (e.g., hydroxy group) present on the surface of the metal oxide (A). Examples of such moieties include a halogen atom bonded directly to a phosphorus atom, and an oxygen atom bonded directly to a phosphorus atom. Typically, the functional group (e.g., hydroxy group) present on the surface of the metal oxide (A) is bonded to the metal atom (M) constituting the metal oxide (A).

Examples of the inorganic phosphorus compound (BI) include phosphorus oxoacids such as phosphoric acid, diphosphoric acid, triphosphoric acid, polyphosphoric acid formed by condensation of 4 or more molecules of phosphoric acid, phosphorous acid, phosphonic acid, phosphonous acid, phosphinic acid, and phosphinous acid; salts of these oxoacids (e.g., sodium phosphate); and derivatives of these oxoacids (e.g., halides such as phosphoryl chloride, and dehydration products such as phosphorus pentoxide).

The inorganic phosphorus compound (BI) may be used alone, or two or more thereof may be used in combination. In view of improving the stability of coating liquid (S) (described later) and the gas barrier properties of the multilayer structure produced, phosphoric acid is preferably used alone or in combination with another inorganic phosphorus compound (BI). When phosphoric acid is used in combination with another inorganic phosphorus compound (BI), phosphoric acid preferably makes up 50 mol % or more of the total inorganic phosphorus compounds (BI).

Reaction Product (D)

The reaction product (D) is obtained by a reaction between the metal oxide (A) and the inorganic phosphorus compound (BI). A compound formed by a reaction between the metal oxide (A), the inorganic phosphorus compound (BI), and another compound is also categorized as the reaction product (D). By containing the reaction product (D) in the layer (Y), a decrease of the peel strength between the base (X) and the layer (Y) after retorting tends to be reduced. By containing the reaction product (D) in the layer (Y) and containing the PVA resin (C) in the layer (Z), the multilayer structure tends to have excellent gas barrier properties after retorting.

In an infrared absorption spectrum of the layer (Y), a maximum absorption wavenumber in the region from 800 to 1,400 cm$^{-1}$ is preferably 1,080 to 1,130 cm$^{-1}$. In the process in which the metal oxide (A) and the inorganic phosphorus compound (BI) react to form the reaction product (D), a metal atom (M) derived from the metal oxide (A) and a phosphorus atom (P) derived from the inorganic phosphorus compound (BI) are linked via an oxygen atom (O) to form a bond represented by M-O—P. As a result, a characteristic absorption band attributed to this bond appears in an infrared absorption spectrum of the reaction product (D). The multilayer structure exhibits good gas barrier properties when the characteristic absorption band attributed to the M-O—P bond is observed in the region from 1,080 to 1,130 cm$^{-1}$. The multilayer structure exhibits much better gas barrier properties particularly when the characteristic absorption band corresponds to the strongest absorption in the region from 800 to 1,400 cm$^{-1}$ where absorptions attributed to bonds between various atoms and oxygen atoms are generally observed.

By contrast, if a metal compound such as a metal alkoxide or metal salt and the inorganic phosphorus compound (BI) are first mixed together and the mixture is then subjected to hydrolytic condensation, the resulting product is a composite material in which the metal atoms derived from the metal compound and the phosphorus atoms derived from the inorganic phosphorus compound (BI) have been almost homogeneously mixed and reacted. In this case, in an infrared absorption spectrum of the composite material, the maximum absorption wavenumber in the region from 800 to 1,400 cm$^{-1}$ falls outside the range of 1,080 to 1,130 cm$^{-1}$.

In the infrared absorption spectrum of the layer (Y), the width at half maximum of the maximum absorption band in the region from 800 to 1,400 cm$^{-1}$ is preferably 200 cm$^{-1}$ or less, more preferably 150 cm$^{-1}$ or less, even more preferably 100 cm$^{-1}$ or less, and particularly preferably 50 cm$^{-1}$ or less, in terms of the gas barrier properties of the resulting multilayer structure.

The infrared absorption spectrum of the layer (Y) can be measured by attenuated total reflection spectroscopy over the region of 800 to 1,400 cm$^{-1}$, using a Fourier transform infrared spectrophotometer (Spectrum One, manufactured by PerkinElmer, Inc.). If the measurement is not possible using this method, the measurement may be conducted by another method, examples of which include, but are not limited to: reflection spectroscopy such as reflection absorption spectroscopy, external reflection spectroscopy, or attenuated total reflection spectroscopy; and transmission spectroscopy such as Nujol method or pellet method performed on the layer (Y) scraped from the multilayer structure.

The layer (Y) may partially include a metal oxide (A) and/or an inorganic phosphorus compound (BI) not involved in the reaction.

In the layer (Y), the molar ratio between metal atoms constituting the metal oxide (A) and phosphorus atoms derived from the inorganic phosphorus compound (BI), as expressed by [metal atoms constituting metal oxide (A)]: [phosphorus atoms derived from inorganic phosphorus compound (BI)], is preferably 1.0:1.0 to 3.6:1.0, more preferably 1.1:1.0 to 3.0:1.0. With the molar ratio falling in these ranges, excellent gas barrier performance can be obtained. The molar ratio in the layer (Y) can be adjusted by adjusting the mixing ratio of the metal oxide (A) and the inorganic phosphorus compound (BI) in the coating liquid (S) used to form the layer (Y). The molar ratio in the layer (Y) is typically equal to that in the coating liquid (S).

The thickness of the layer (Y) (or, for a multilayer structure including two or more layers (Y), the total thickness of the layers (Y)) is preferably 0.05 to 4.0 μm, more preferably 0.1 to 2.0 μm. Thinning the layer (Y) provides a reduction in the dimensional change of the multilayer structure during a process such as printing or lamination. With a reduced thickness, the layer (Y) makes the multilayer structure more flexible, allowing the multilayer structure to have mechanical properties close to the mechanical properties of the base itself. When a multilayer structure of the present invention has two or more layers (Y), the thickness of each layer (Y) is preferably 0.05 am or more in view of gas barrier properties. The thickness of layer (Y) can be controlled by the concentration of the coating liquid (S) (described later) used to form the layer (Y), or by the method used to apply the coating liquid (S). The thickness of the layer (Y) can be measured by observing a cross-section of the multilayer structure with a scanning electron microscope or transmission electron microscope.

Aside from the foregoing components, the layer (Y) may comprise at least one selected from the group consisting of an organic phosphorus compound (BO) and a polymer (F).

Organic Phosphorus Compound (BO)

Preferably, the organic phosphorus compound (BO) is a polymer (BOa) having a plurality of phosphorus atoms, or an organic phosphorus compound (BOb).

Polymer (BOa) Having a Plurality of Phosphorus Atoms

Examples of phosphorus atom-containing functional groups of polymer (BOa) include a phosphoric acid group, a phosphorous acid group, a phosphonic acid group, a phosphonous acid group, a phosphinic acid group, and a phosphinous acid group, and functional groups derived from these groups (for example, salts, (partial) ester compounds, halides (for example, chlorides), and dehydration products). Among these, a phosphoric acid group and a phosphonic acid group are preferred, and a phosphonic acid group is more preferred.

Examples of the polymer (BOa) include: polymers of phosphono(meth)acrylic acid ester compounds such as 6-[(2-phosphonoacetyl)oxy]hexyl acrylate, 2-phosphonooxyethyl methacrylate, phosphonomethyl methacrylate, 11-phosphonoundecyl methacrylate, and 1,1-diphosphonoethyl methacrylate; polymers of vinylphosphonic acid compounds such as vinylphosphonic acid, 2-propene-1-phosphonic acid, 4-vinylbenzylphosphonic acid, and 4-vinylphenylphosphonic acid; polymers of vinylphosphinic acid compounds such as vinylphosphinic acid and 4-vinylbenzylphosphinic acid; and phosphorylated starch. The polymer (BOa) may be a homopolymer of a monomer having at least one phosphorus atom-containing functional group or may be a copolymer of two or more monomers. Alternatively, a combination of two or more polymers each formed from a single monomer may be used as the polymer (BOa). In particular, a polymer of a phosphono(meth)acrylic acid ester compound and a polymer of a vinylphosphonic acid compound are preferred, and a polymer of a vinylphosphonic acid compound is more preferred. That is, poly(vinylphosphonic acid) is preferred as the polymer (BOa). The polymer (BOa) can be obtained also by homopolymerization or copolymerization of a vinylphosphonic acid derivative such as a vinylphosphonic acid halide or vinylphosphonic acid ester, followed by hydrolysis.

Alternatively, the polymer (BOa) may be a copolymer of a monomer having at least one phosphorus atom-containing functional group and another vinyl monomer. Examples of the other vinyl monomer copolymerizable with the monomer having the phosphorus atom-containing functional group include (meth)acrylic acid, (meth)acrylic acid esters, acrylonitrile, methacrylonitrile, styrene, nuclear-substituted styrenes, alkyl vinyl ethers, alkyl vinyl esters, perfluoroalkyl vinyl ethers, perfluoroalkyl vinyl esters, maleic acid, maleic anhydride, fumaric acid, itaconic acid, maleimide, and phenylmaleimide. Among these, (meth)acrylic acid esters, acrylonitrile, styrene, maleimide, and phenylmaleimide are preferred.

In order to obtain a multilayer structure that has higher bending resistance, the proportion of the structural units derived from the monomer having the phosphorus atom-containing functional group in the total structural units of the polymer (BOa) is preferably 10 mol % or more, more preferably 20 mol % or more, even more preferably 40 mol % or more, and particularly preferably 70 mol % or more, and may be 100 mol %.

The molecular weight of the polymer (BOa) is not particularly limited, but is preferably such that the number-average molecular weight is in the range of 1,000 to 100,000. When the number-average molecular weight is in this range, the bending-resistance improving effect produced by stacking of the layer (Y), and the viscosity stability of the coating liquid (S) when it is used (described later) can be satisfied at a high level.

When the layer (Y) in the multilayer structure contains the inorganic phosphorus compound (BI) and the polymer (BOa), the ratio $W_{BOa}/W_{BI}$ of the mass $W_{BI}$ of inorganic phosphorus compound (BI) and the mass $W_{BOa}$ of polymer (BOa) preferably satisfies the relationship $0.01/99.99 \leq W_{BOa}/W_{BI} < 6.00/94.00$ In view of excellence of barrier performance, the ratio $W_{BOa}/W_{BI}$ more preferably satisfies the relationship $0.10/99.90 \leq W_{BOa}/W_{BI} < 4.50/95.50$, even more preferably $0.20/99.80 \leq W_{BOa}/W_{BI} < 4.00/96.00$, particularly preferably $0.50/99.50 \leq W_{BOa}/W_{BIb} <_{3.50/96.50}$. In other words, $W_{BI}$ is preferably more than 94.00 and 99.99 or less, much greater than $W_{BOa}$, which is 0.01 or more and less than 6.00. It is to be noted that when the inorganic phosphorus compound (BI) and/or organic phosphorus compound (BOa) have undergone a reaction in the layer (Y), a part of the inorganic phosphorus compound (BI) and/or organic phosphorus compound (BOa) forming the reaction product (D) is regarded as inorganic phosphorus compound (BI) and/or organic phosphorus compound (BOa). In this case, the mass of the inorganic phosphorus compound (BI) and/or organic phosphorus compound (BOa) used in the formation of the reaction product (D) (the mass of the inorganic phosphorus compound (BI) and/or organic phosphorus compound (BOa) before reaction) is included in the mass of the inorganic phosphorus compound (BI) and/or organic phosphorus compound (BOa) in the layer (Y).

Organic Phosphorus Compound (BOb)

In the organic phosphorus compound (BOb), a phosphorus atom having at least one hydroxy group attached thereto and a polar group are bonded via an alkylene chain having 3 to 20 carbon atoms or a polyoxyalkylene chain based on an alkylene having 3 to 20 carbon atoms. The organic phosphorus compound (BOb) has lower surface free energy than the metal oxide (A), the inorganic phosphorus compound (BI), and the reaction product (D), and segregates to the surface side in the process of formation of a precursor of the layer (Y). The organic phosphorus compound (BOb) has: a phosphorus atom to which at least one hydroxy group capable of reacting with the components contained in the layer (Y) is attached, and a polar group capable of reacting with another member (e.g., an adhesive layer (I) or additional layer (J) such as an ink layer). Therefore, the cohesion of the multilayer structure is enhanced so that the interlayer adhesion can be maintained even after retorting under stress. This makes it possible to prevent appearance defects such as delamination.

Examples of the organic phosphorus compound (BOb) include 3-hydroxypropylphosphonic acid, 4-hydroxybutylphosphonic acid, 5-hydroxypentylphosphonic acid, 6-hydroxyhexylphosphonic acid, 7-hydroxyheptylphosphonic acid, 8-hydroxyoctylphosphonic acid, 9-hydroxynonylphosphonic acid, 10-hydroxydecylphosphonic acid, 11-hydroxyundecylphosphonic acid, 12-hydroxydodecylphosphonic acid, 13-hydroxytridecylphosphonic acid, 14-hydroxytetradecylphosphonic acid, 15-hydroxypentadecylphosphonic acid, 16-hydroxyhexadecylphosphonic acid, 17-hydroxyheptadecylphosphonic acid, 18-hydroxyoctadecylphosphonic acid, 19-hydroxynonadecylphosphonic acid, 20-hydroxyicosylphosphonic acid, 3-hydroxypropyl dihydrogen phosphate, 4-hydroxybutyl dihydrogen phosphate, 5-hydroxypentyl dihydrogen phosphate, 6-hydroxyhexyl dihydrogen phosphate, 7-hydroxyheptyl dihydrogen phosphate, 8-hydroxyoctyl dihydrogen phosphate, 9-hydroxynonyl dihydrogen phosphate, 10-hydroxydecyl dihydrogen phosphate, 11-hydroxyundecyl dihydrogen phosphate, 12-hydroxydodecyl dihydrogen phosphate, 13-hydroxytridecyl dihydrogen phosphate, 14-hydroxytetradecyl dihydrogen phosphate, 15-hydroxypentadecyl dihydrogen phosphate, 16-hydroxyhexadecyl dihydrogen phosphate, 17-hydroxyheptadecyl dihydrogen phosphate, 18-hydroxyoctadecyl dihydrogen phosphate, 19-hydroxynonadecyl dihydrogen phosphate, 20-hydroxyicosyl dihydrogen phosphate, 3-carboxypropylphosphonic acid, 4-carboxybutylphosphonic acid, 5-carboxypentylphosphonic acid, 6-carboxyhexylphosphonic acid, 7-carboxyheptylphosphonic acid, 8-carboxyoctylphosphonic acid, 9-carboxynonylphosphonic acid, 10-carboxydecylphosphonic acid, 11-carboxyundecylphosphonic acid, 12-carboxydodecylphosphonic acid, 13-carboxytridecylphosphonic acid, 14-carboxytetradecylphosphonic acid, 15-carboxypentadecylphosphonic acid, 16-carboxyhexadecylphosphonic acid, 17-carboxyheptadecylphosphonic acid, 18-carboxyoctadecylphosphonic acid, 19-carboxynonadecylphosphonic acid, and 20-carboxyicosylphosphonic acid. These may be used alone, or two or more thereof may be used in combination.

When the layer (Y) in the multilayer structure contains the inorganic phosphorus compound (BI) and organic phosphorus compound (BOb), the ratio $M_{BOb}/M_{BI}$ of the number of moles $M_{BOb}$ of organic phosphorus compound (BOb) and the number of moles $M_{BI}$ of inorganic phosphorus compound (BI) in the layer (Y) preferably satisfies the relationship $1.0 \times 10-4 < M_{BOb}/M_{BI}$ $2.0 \times 10^{-2}$. The ratio $M_{BOb}/M_{BI}$ more preferably satisfies the relationship $3.5 \times 10-4 < M_{BOb}/M_{BI}$ $1.0 \times 10^{-2}$ in terms of better cohesion. The ratio $M_{BOb}/M_{BI}$ even more preferably satisfies the relationship $5.0 \times 10^{-4} \leq M_{BOb}/M_{BI} \leq 6.0 \times 10^{-3}$ in terms of better cohesion and better barrier performance. The number of moles $M_{BI}$ of the inorganic phosphorus compound (BI) in $M_{BOb}/M_{BI}$ refers to the number of moles of the inorganic phosphorus compound (BI) involved in formation of the reaction product (D).

When the layer (Y) contains the organic phosphorus compound (BOb), a C/Al ratio as measured by X-ray photoelectron spectroscopy (XPS) in a 5 nm-deep area of the layer (Y) from the surface not contacting the base (X) via the layer (Z) in the multilayer structure is preferably 0.1 to 15.0, more preferably 0.3 to 10.0, even more preferably 0.5 to 5.0. In this way, good cohesion can be exhibited when the organic phosphorus compound (BOb) is present in the surface of the layer (Y).

Polymer (F)

The layer (Y) may comprise a polymer (F) having at least one functional group selected from the group consisting of a carbonyl group, a hydroxyl group, a carboxyl group, a carboxylic acid anhydride group, and a salt of a carboxyl group. Preferably, the polymer (F) is a polymer having at least one functional group selected from the group consisting of a hydroxyl group and a carboxyl group.

Examples of the polymer (F) include polyethylene glycol; PVA polymers such as PVA, a modified PVA containing 1 to 50 mol % of an α-olefin unit having at most 4 carbon atoms, and polyvinyl acetal (e.g., polyvinyl butyral); polysaccharides such as cellulose and starch; (meth)acrylic acid polymers such as polyhydroxyethyl (meth)acrylate, poly(meth) acrylic acid, and an ethylene-acrylic acid copolymer; and maleic acid polymers such as hydrolysates of an ethylene-maleic anhydride copolymer, hydrolysates of a styrene-maleic anhydride copolymer, and hydrolysates of an isobutylene-maleic anhydride alternate copolymer. Preferred are polyethylene glycol, and PVA polymers. The preferred form of a PVA polymer used as polymer (F) is the same as that of the PVA resin (C) contained in the layer (Z).

The polymer (F) may be a homopolymer of a monomer having a polymerizable group, a copolymer of two or more monomers, or a copolymer of a monomer having a hydroxyl group and/or a carboxy group, and a monomer having no hydroxyl group or carboxy group. The polymer (F) may be a combination of two or more polymers (F).

The molecular weight of polymer (F) is not particularly limited. However, in order to obtain a multilayer structure having even better gas barrier properties and mechanical strength, the polymer (F) has a weight-average molecular weight of preferably 5,000 or more, more preferably 8,000 or more, even more preferably 10,000 or more. The upper limit of weight-average molecular weight of polymer (F) is not particularly limited, and may be, for example, 1,500,000 or less.

In view of maintaining the good appearance of the multilayer structure, the content of the polymer (F) in the layer (Y) is preferably less than 50 mass %, more preferably 20 mass % or less, even more preferably 10 mass % or less, and may be 0 mass %, relative to the mass of the layer (Y). The polymer (F) may or may not react with the components of the layer (Y).

The layer (Y) may additionally comprise other components. Examples of additional components of the layer (Y) include metal salts of inorganic acids, such as metal carbonates, metal hydrochlorides, metal nitrates, metal hydrogen carbonates, metal sulfates, metal hydrogen sulfates, and metal borates; metal salts of organic acids, such as metal oxalates, metal acetates, metal tartrates, and metal stearates; metal complexes such as a cyclopentadienyl metal complex (e.g., titanocene) and a cyanometal complex (e.g., Prussian blue); layered clay compounds; crosslinkers; polymer compounds other than the polymer (BOa) and polymer (F); plasticizers; antioxidants; ultraviolet absorbers; and fire retardants. The content of the additional components in the layer (Y) of the multilayer structure is preferably 50 mass % or less, more preferably 20 mass % or less, even more preferably 10 mass % or less, particularly preferably 5 mass % or less, and may be 0 mass % (containing no additional components).

Layer (W)

On the layer (Y), a multilayer structure of the present invention may comprise a layer (W) containing at least one selected from the group consisting of an organic phosphorus compound (BO) and a polymer (F). When a multilayer structure of the present invention includes the layer (W), it is preferable that the layer (W) be directly stacked on the layer (Y). The preferred embodiment of an organic phosphorus compound (BO) and a polymer (F) that may be contained in the layer (W) is as described above. By the provision of the layer (W) in a multilayer structure of the present invention, the bending resistance and the adhesion to a different layer (J) (described later) tend to improve.

The layer (W) may additionally comprise other components. Examples of such additional components include metal salts of inorganic acids, such as metal carbonates, metal hydrochlorides, metal nitrates, metal hydrogen carbonates, metal sulfates, metal hydrogen sulfates, and metal borates; metal salts of organic acids, such as metal oxalates, metal acetates, metal tartrates, and metal stearates; metal complexes such as a cyclopentadienyl metal complex (e.g., titanocene) and a cyanometal complex (e.g., Prussian blue); layered clay compounds; crosslinkers; polymer compounds other than the polymer (BOa) and polymer (F); plasticizers; antioxidants; ultraviolet absorbers; and fire retardants. The content of the additional components in the layer (W) is preferably 50 mass % or less, more preferably 20 mass % or less, even more preferably 10 mass % or less, particularly preferably 5 mass % or less, and may be 0 mass % (containing no additional components).

A multilayer structure of the present invention may comprise an inorganic deposition layer in a position different from the base (X). The preferred embodiment is the same as that described for the inorganic deposition layer (X').

A multilayer structure of the present invention has a peel strength of preferably 100 gf/15 mm or more, more preferably 200 gf/15 mm or more, even more preferably 260 gf/15 mm or more as measured between the base (X) and the layer (Y) while dropping water on the delaminating interface after 125° C., 30-minute retorting. The peel strength measured while dropping water on the delaminating interface can be adjusted by, for example, the mass ratio of PVA resin (C) and polyester resin (L) in the layer (Z). The method of measurement of peel strength is as described in the EXAMPLES section below.

Method of Production of Multilayer Structure

The features described for the multilayer structure of the present invention can be applied to the production method of the present invention and may not be described repeatedly. The features described for the production method of the present invention can be applied to the multilayer structure of the present invention.

An example of the method for producing a multilayer structure according to the present invention is a method that comprises:
- a step (I) of applying a coating liquid (R) containing a PVA resin (C), a polyester resin (La), and a solvent to a base (X), and removing the solvent to form a layer (Z);
- a step (II) of applying a coating liquid (S) containing an aluminum-containing metal oxide (A), an inorganic phosphorus compound (BI), and a solvent to the layer (Z), and removing the solvent to form a precursor layer of layer (Y); and
- a step (III) of heat treating the precursor layer of layer (Y) to form a layer (Y) containing a reaction product (D).

When producing a multilayer structure containing an organic phosphorus compound (BO) or a polymer (F), an organic phosphorus compound (BO) or a polymer (F) may be contained in the coating liquid (S) used in step (II). Alternatively, the method may include a step (IV) of preparing a coating liquid (T) containing an organic phosphorus compound (BO) or a polymer (F) in advance, and applying the coating liquid (T) to the surface of the precursor layer of layer (Y) obtained in step (II).

Step (I)

In step (I), a coating liquid (R) containing a PVA resin (C), a polyester resin (La), and a solvent is applied to the base (X), and the solvent is removed to form a layer (Z). The polyester resin (La) is regarded as polyester resin (L) when the layer (Z) is formed. Here, the polyester resin (La) may be a precursor that generates the polyester resin (L) in the process of removing the solvent, or the polyester resin (La) and the polyester resin (L) may be the same polyester resin. The coating liquid (R) can be obtained by mixing a PVA resin (C), a polyester resin (La), and a solvent.

As an example of a means of obtaining the coating liquid (R), the coating liquid (R) may be obtained by directly mixing a PVA resin (C), a polyester resin (La), and a solvent, or by mixing a solution or dispersion of PVA resin (C) with a solution or dispersion of polyester resin (La). In view of the homogeneity of the solution, it is preferable that the coating liquid (R) be obtained by mixing an aqueous solution of PVA resin (C) with a dispersion of polyester resin (La).

The solvent used for the coating liquid (R) is not particularly limited. However, the solvent is preferably a solvent containing water as a main component, or the solvent may be solely water. Alcohols such as methanol, ethanol, and isopropanol can preferably be used as other solvents when using a solvent containing water as a main component.

In view of the storage stability of the coating liquid (R) and the quality of application to the base, the solids concentration of coating liquid (R) is preferably 0.01 to 10 mass %. The solids concentration can be determined, for example, by distilling off the solvent from the coating liquid (R) and dividing the mass of the remaining solids by the initial mass of the coating liquid (R) yet to be subjected to the distillation.

The method for application of the coating liquid (R) is not particularly limited, and any known method can be employed. Examples of the method for application include casting, dipping, roll coating, gravure coating, screen printing, reverse coating, spray coating, kiss coating, die coating, metering bar coating, chamber doctor-using coating, curtain coating, and bar coating.

The thickness of the layer (Z) formed after the application of the coating liquid (R) to the base (X) can be controlled by the solids concentration of coating liquid (R) or by the application method. For example, in the case of gravure coating, the thickness of the layer (Z) can be controlled by varying the cell volume of a gravure roll.

The method of removing the solvent of the coating liquid (R) after the application of the coating liquid (R) to the base (X) is not particularly limited, and known drying methods may be used. Examples of the drying methods include hot air drying, hot roll contact drying, infrared heating, and microwave heating.

Step (II)

In step (II), a coating liquid (S) containing an aluminum-containing metal oxide (A), an inorganic phosphorus compound (BI), and a solvent is applied to the layer (Z), and the solvent is removed to form a precursor layer of layer (Y). The coating liquid (S) can be obtained by mixing an aluminum-containing metal oxide (A), an inorganic phosphorus compound (BI), and a solvent.

Examples of specific means of preparing the coating liquid (S) include a method that mixes a dispersion of metal oxide (A) with a solution containing inorganic phosphorus compound (BI), and a method that adds and mixes inorganic phosphorus compound (BI) into a dispersion of metal oxide (A). The temperature during the mixing is preferably 50° C. or lower, more preferably 30° C. or lower, and even more preferably 20° C. or lower. The coating liquid (S) may contain other compounds (for example, organic phosphorus compound (BO), polymer (F)), and may optionally contain at least one acid compound (Q) selected from the group consisting of acetic acid, hydrochloric acid, nitric acid, trifluoroacetic acid, and trichloroacetic acid.

The dispersion of the metal oxide (A) can be prepared, for example, by mixing the compound (E), water, and optionally an acid catalyst or organic solvent and allowing the compound (E) to undergo condensation or hydrolytic condensation according to procedures employed in known sol-gel processes. When the dispersion of the metal oxide (A) is obtained by condensation or hydrolytic condensation of the compound (E), the dispersion obtained may be optionally subjected to a certain process (such as deflocculation in the presence of the acid compound (Q)). The solvent used for the preparation of a dispersion of metal oxide (A) is preferably, but not limited to, an alcohol such as methanol, ethanol, or isopropanol, water, or a mixed solvent thereof.

The solvent used for the solution containing inorganic phosphorus compound (BI) can be selected as appropriate depending on the type of the inorganic phosphorus compound (BI), and preferably contains water. The solvent may contain an organic solvent (e.g., an alcohol such as methanol) as long as the organic solvent does not hinder the dissolution of the inorganic phosphorus compound (BI).

The solids concentration in the coating liquid (S) is preferably 1 to 20 mass %, more preferably 2 to 15 mass %, and even more preferably 3 to 10 mass %, in terms of the storage stability of the coating liquid and the quality of application of the coating liquid onto the base. The solids concentration can be determined, for example, by distilling off the solvent from the coating liquid (S) and dividing the mass of the remaining solids by the initial mass of the coating liquid (S) yet to be subjected to the distillation.

The viscosity of the coating liquid (S) is preferably 3,000 mPa·s or less, more preferably 2,500 mPa·s or less, and even more preferably 2,000 mPa·s or less, as measured with a Brookfield rotary viscometer (SB-type viscometer: rotor No. 3, rotational speed=60 rpm) at a temperature at which the coating liquid (S) is applied. Controlling the viscosity to 3,000 mPa·s or less improves the leveling of the coating liquid (S), thus allowing the resulting multilayer structure to have better appearance. The viscosity of the coating liquid (S) is preferably 50 mPa·s or more, more preferably 100 mPa·s or more, and even more preferably 200 mPa·s or more.

The molar ratio of aluminum atoms and phosphorus atoms in the coating liquid (S), as expressed by [aluminum atoms]:[phosphorus atoms], is preferably 1.0:1.0 to 3.6:1.0, more preferably 1.1:1.0 to 3.0:1.0, even more preferably 1.11:1.00 to 1.50:1.00. The molar ratio of aluminum atoms and phosphorus atoms can be determined by x-ray fluorescence analysis of a solid obtained by drying the coating liquid (S).

The method for application of the coating liquid (S) is not particularly limited, and any known method can be employed. Examples of the method for application include casting, dipping, roll coating, gravure coating, screen printing, reverse coating, spray coating, kiss coating, die coating, metering bar coating, chamber doctor-using coating, curtain coating, and bar coating.

The method for removing the solvent after application of the coating liquid (S) (drying process) is not particularly limited, and known drying methods can be employed. Examples of the drying methods include hot air drying, hot roll contact drying, infrared heating, and microwave heating.

The drying temperature is preferably below the onset temperature of fluidization of the base (X). The drying temperature after application of the coating liquid (S) may be, for example, about 60 to 180° C., and is more preferably 60° C. or more and less than 140° C., even more preferably 70° C. or more and less than 130° C., particularly preferably 80° C. or more and less than 120° C. The drying time is not particularly limited, and is preferably at least 1 second and shorter than 1 hour, more preferably at least 5 seconds and shorter than 15 minutes, even more preferably at least 5 seconds and shorter than 300 seconds. When the drying temperature is 100° C. or more (for example, 100 to 140° C.), the drying time is preferably at least 1 second and shorter than 4 minutes, more preferably at least 5 seconds and shorter than 4 minutes, even more preferably at least 5 seconds and shorter than 3 minutes. When the drying temperature is below 100° C. (for example, 60 to 99° C.), the drying time is preferably at least 3 minutes and shorter than 1 hour, more preferably at least 6 minutes and shorter than 30 minutes, even more preferably at least 8 minutes and shorter than 25 minutes. With the drying conditions of coating liquid (S) confined in these ranges, the multilayer structure obtained tends to have even better gas barrier properties.

Step (III)

In step (III), the precursor layer of layer (Y) formed in step (II) is heat treated to form a layer (Y). In step (III), a reaction proceeds that produces a reaction product (D). For the reaction to sufficiently proceed, the heat-treatment temperature is preferably 140° C. or more, more preferably 170° C. or more, even more preferably 180° C. or more, particularly preferably 190° C. or more. Low heat-treatment temperatures lead to decreased productivity because the time required to produce a sufficient reaction rate increases as the heat-treatment temperature decreases. The heat-treatment temperature depends on factors such as the type of base (X), and the heat-treatment temperature is preferably 270° C. or less when, for example, a thermoplastic resin film made of polyamide resin is used as base (X). When a thermoplastic resin film made of polyester resin is used as base (X), the heat-treatment temperature is preferably 240° C. or less. The heat treatment may be carried out, for example, in an air atmosphere, a nitrogen atmosphere, or an argon atmosphere. The heat-treatment time is preferably 1 second to 1 hour, more preferably 1 second to 15 minutes, even more preferably 5 to 300 seconds.

In view of developing even better barrier performance, it is preferable that step (III) include a first heat-treatment step (III-1) and a second heat-treatment step (III-2). When the heat treatment is performed in two or more stages, it is preferable that the temperature of the heat treatment in the second stage (hereinafter, "second heat treatment) be higher than the temperature of the heat treatment in the first stage (hereinafter, first heat treatment). More preferably, the temperature of the second heat treatment is higher than the temperature of the first heat treatment by at least 15° C., even more preferably by at least 20° C., particularly preferably by at least 30° C.

In view of providing a multilayer structure having good properties, it is preferable that the heat-treatment temperature (a first heat-treatment temperature when the heat treatment is performed in two or more stages) in step (III) be higher than the drying temperature of step (II), preferably by at least 30° C., more preferably by at least 50° C., even more preferably by at least 55° C., particularly preferably by at least 60° C.

When the heat treatment in step (III) is performed in two or more stages, it is preferable that the temperature of the first heat treatment be 140° C. or more and less than 200° C., and that the temperature of the second heat treatment be 180° C. to 270° C. Preferably, the temperature of the second heat treatment is higher than the first heat-treatment temperature. More preferably, the temperature of the second heat treatment is higher than the first heat-treatment temperature by at least 15° C., even more preferably by at least 25° C. When the heat-treatment temperature is 200° C. or higher, the heat-treatment time is preferably 0.1 seconds to 10 minutes, more preferably 0.5 seconds to 5 minutes, even more preferably 1 second to 3 minutes. When the heat-treatment temperature is below 200° C., the heat-treatment time is preferably 1 second to 15 minutes, more preferably 5 seconds to 10 minutes, even more preferably 10 seconds to 5 minutes.

Step (IV)

When using the organic phosphorus compound (BO), the polymer (F), and/or other components in the production method, the method may include a step (IV) in which the coating liquid (T) obtained by mixing the organic phosphorus compound (BO), the polymer (F) and/or other components with a solvent is dried after being applied to the precursor of layer (Y) obtained in step (II), or to the layer (Y) obtained in step (III) or the precursor layer of layer (Y) obtained in step (III-1). When the step (III) is followed by step (IV), it is preferable to perform a heat treatment after drying in step (IV), under the same conditions used in step (III). When step (IV) is performed after step (III-1), it is preferable to perform a step (111-2) after drying in step (IV).

The solvent used for the coating liquid (T) can be selected as appropriate according to the type of organic phosphorus compound (BO), and the solvent is preferably an alcohol such as methanol, ethanol, or isopropanol, water, or a mixed solvent thereof.

The solids concentration in the coating liquid (T) is preferably 0.01 to 60 mass %, more preferably 0.1 to 50 mass %, even more preferably 0.2 to 40 mass % in terms of the storage stability or quality of application of the liquid. The solids concentration can be determined by the same method described for the coating liquid (S).

As is the case of application of the coating liquid (S), the method of application of the coating liquid (T) is not particularly limited, and known methods can be employed.

Removal of the solvent after the application of the coating liquid (T) in step (IV) (drying process) can be performed under the same conditions used for drying of a solvent after the application of coating liquid (S) in step (II).

Additional Layer (J)

The multilayer structure of the present invention may comprise an additional layer (J) to improve various properties (for example, heat sealing properties, barrier properties, mechanical characteristics). Such a multilayer structure of the present invention can be produced, for example, by stacking the layer (Y) (and, optionally, a layer (W)) on the base (X) via layer (Z), and attaching or forming the additional layer (J) either directly or via an adhesive layer. Examples of the additional layer (J) include, but are not limited to, ink layers and thermoplastic resin layers such as a polyolefin layer and an ethylene-vinyl alcohol copolymer resin layer.

A multilayer structure of the present invention may include an ink layer on which a product name, decorative pattern, or the like is to be printed. Examples of the ink layer include a film resulting from drying of a liquid prepared by dispersing a polyurethane resin containing a pigment (e.g., titanium dioxide) in a solvent. The ink layer may be a film resulting from drying of an ink or electronic circuit-forming resist containing a polyurethane resin free of any pigment or another resin as a main component. Methods for applying the ink layer include gravure printing and various coating methods using a wire bar, a spin coater, or a die coater. The thickness of the ink layer is preferably 0.5 to 10.0 μm, more preferably 1.0 to 4.0 μm.

Placing a polyolefin layer as an outermost layer of the multilayer structure of the present invention can impart heat-sealing properties to the multilayer structure or improve the mechanical characteristics of the multilayer structure. In terms of, for example, the impartation of heat-sealing properties and the improvement in mechanical characteristics, the polyolefin is preferably polypropylene or polyethylene. It is also preferable to stack at least one film selected from the group consisting of a film made of a polyester, a film made of a polyamide, and a film made of a hydroxy group-containing polymer, in order to improve the mechanical characteristics of the multilayer structure. In terms of improvement of mechanical characteristics, the polyester is preferably polyethylene terephthalate, the polyamide is preferably nylon-6, and the hydroxy group-containing polymer is preferably ethylene-vinyl alcohol copolymer.

The additional layer (J) may be a layer formed by extrusion coating lamination. The extrusion coating lamination method that can be used in the present invention is not particularly limited, and known methods can be used. In a typical extrusion coating lamination method, a molten thermoplastic resin is fed to a T-die, and the thermoplastic resin is cooled into a laminate film as the resin discharges from a flat slit of the T-die.

Examples of extrusion coating lamination methods other than the single lamination described above include sandwich lamination and tandem lamination. The sandwich lamination is a method for producing a laminate by extruding a molten thermoplastic resin onto a first base supplied from an unwinder (feed roll), and bonding the extruded thermoplastic resin to a second base supplied from another unwinder. The tandem lamination is a method for producing a 5-layer laminate at once with two single-lamination machines used in tandem.

Adhesive Layer (I)

In a multilayer structure of the present invention, the adhesion between the layer (Y) and other members (for example, additional layer (J)) can be enhanced by using an adhesive layer (I). The adhesive layer (I) may be made of an adhesive resin. The adhesive resin is preferably a two-component reactive polyurethane adhesive including a polyisocyanate component and a polyol component which are to be mixed and reacted. Addition of a small amount of an additive such as a known silane coupling agent to the anchor coating agent or adhesive may further enhance the adhesion. Examples of the silane coupling agent include, but are not limited to, silane coupling agents having a reactive group such as an isocyanate, epoxy, amino, ureido, or mercapto group. By bonding the layer (Y) to other members, it is possible to effectively prevent deterioration in the gas barrier properties or appearance of a multilayer structure of the present invention when the multilayer structure is subjected to a process such as printing or lamination. It is also possible to increase the drop impact resistance of a packaging material including a multilayer structure of the present invention. The thickness of the adhesive layer (I) is preferably 0.01 to 10.0 μm, more preferably 0.03 to 5.0 μm.

Configuration of Multilayer Structure

Specific example configurations of a multilayer structure of the present invention are as follows. The configuration of each specific example may be a combination of more than one configuration of the same example. In the following specific examples, the base (X) and additional layer (J) are represented by names of specific resins. The order of layers (layer (Y)/layer (Z)) between layers represented by names of specific resins (between base (X) and additional layer (J)) may be reversed (layer (Z)/layer (Y)). Here, the symbol "/" means that the layers are laminated either directly or via an adhesive layer.

(1) Layer (Y)/layer (Z)/polyester layer
(2) Layer (Y)/layer (Z)/polyester layer/layer (Z)/layer (Y)
(3) Layer (Y)/layer (Z)/polyamide layer
(4) Layer (Y)/layer (Z)/polyamide layer/layer (Z)/layer (Y)
(5) Layer (Y)/layer (Z)/polyolefin layer
(6) Layer (Y)/layer (Z)/polyolefin layer/layer (Z)/layer (Y)
(7) Layer (Y)/layer (Z)/hydroxyl group-containing polymer layer
(8) Layer (Y)/layer (Z)/hydroxyl group-containing polymer layer/layer (Z)/layer (Y)
(9) Layer (Y)/layer (Z)/paper layer
(10) Layer (Y)/layer (Z)/paper layer/layer (Z)/layer (Y)
(11) Layer (Y)/layer (Z)/inorganic deposition layer/polyester layer
(12) Layer (Y)/layer (Z)/inorganic deposition layer/polyamide layer
(13) Layer (Y)/layer (Z)/inorganic deposition layer/polyolefin layer
(14) Layer (Y)/layer (Z)/inorganic deposition layer/hydroxyl group-containing polymer layer
(15) Layer (Y)/layer (Z)/polyester layer/polyamide layer/polyolefin layer
(16) Layer (Y)/layer (Z)/polyester layer/layer (Z)/layer (Y)/polyamide layer/polyolefin layer

(17) Polyester layer/layer (Y)/layer (Z)/polyester layer/layer (Z)/layer (Y)/inorganic deposition layer/hydroxyl group-containing polymer layer/polyolefin layer
(18) Polyester layer/layer (Z)/layer (Y)/polyamide layer/polyolefin layer
(19) Layer (Y)/layer (Z)/polyamide layer/polyester layer/polyolefin layer
(20) Layer (Y)/layer (Z)/polyamide layer/layer (Z)/layer (Y)/polyester layer/polyolefin layer
(21) Polyamide layer/layer (Z)/layer (Y)/polyester layer/polyolefin layer
(22) Layer (Y)/layer (Z)/polyolefin layer/polyamide layer/polyolefin layer
(23) Layer (Y)/layer (Z)/polyolefin layer/layer (Z)/layer (Y)/polyamide layer/polyolefin layer
(24) Polyolefin layer/layer (Z)/layer (Y)/polyamide layer/polyolefin layer
(25) Layer (Y)/layer (Z)/polyolefin layer/polyolefin layer
(26) Layer (Y)/layer (Z)/polyolefin layer/layer (Z)/layer (Y)/polyolefin layer
(27) Polyolefin layer/layer (Y)/layer (Z)/polyolefin layer
(28) Layer (Y)/layer (Z)/polyester layer/polyolefin layer
(29) Layer (Y)/layer (Z)/polyester layer/layer (Z)/layer (Y)/polyolefin layer
(30) Polyester layer/layer (Z)/layer (Y)/polyolefin layer
(31) Layer (Y)/layer (Z)/polyamide layer/polyolefin layer
(32) Layer (Y)/layer (Z)/polyamide layer/layer (Z)/layer (Y)/polyolefin layer
(33) Polyamide layer/layer (Z)/layer (Y)/polyolefin layer
(34) Layer (Y)/layer (Z)/polyester layer/paper layer
(35) Layer (Y)/layer (Z)/polyamide layer/paper layer
(36) Layer (Y)/layer (Z)/polyolefin layer/paper layer
(37) Polyolefin layer/paper layer/polyolefin layer/layer (Z)/layer (Y)/polyester layer/polyolefin layer
(38) Polyolefin layer/paper layer/polyolefin layer/layer (Z)/layer (Y)/polyamide layer/polyolefin layer
(39) Polyolefin layer/paper layer/polyolefin layer/layer (Z)/layer (Y)/polyolefin layer
(40) Paper layer/polyolefin layer/layer (Z)/layer (Y)/polyester layer/polyolefin layer
(41) Polyolefin layer/paper layer/layer (Y)/layer (Z)/polyolefin layer
(42) Paper layer/layer (Y)/layer (Z)/polyester layer/polyolefin layer
(43) Paper layer/layer (Y)/layer (Z)/polyolefin layer
(44) Layer (Y)/layer (Z)/paper layer/polyolefin layer
(45) Layer (Y)/layer (Z)/polyester layer/paper layer/polyolefin layer
(46) Polyolefin layer/paper layer/polyolefin layer/layer (Y)/layer (Z)/polyolefin layer/hydroxyl group-containing polymer layer
(47) Polyolefin layer/paper layer/polyolefin layer/layer (Y)/layer (Z)/polyolefin layer/polyamide layer
(48) Polyolefin layer/paper layer/polyolefin layer/layer (Y)/layer (Z)/polyolefin layer/polyester layer
(49) Inorganic deposition layer/layer (Y)/layer (Z)/polyester layer
(50) Inorganic deposition layer/layer (Y)/layer (Z)/polyester layer/layer (Z)/layer (Y)/inorganic deposition layer
(51) Inorganic deposition layer/layer (Y)/layer (Z)/polyamide layer
(52) Inorganic deposition layer/layer (Y)/layer (Z)/polyamide layer/layer (Z)/layer (Y)/inorganic deposition layer
(53) Inorganic deposition layer/layer (Y)/layer (Z)/polyolefin layer
(54) Inorganic deposition layer/layer (Y)/layer (Z)/polyolefin layer/layer (Z)/layer (Y)/inorganic deposition layer In these examples, the inorganic deposition layer is preferably a deposition layer of aluminum, and/or a deposition layer of aluminum oxide. In the foregoing examples, the hydroxyl group-containing polymer layer is preferably an ethylene-vinyl alcohol copolymer. In the foregoing examples, the polyolefin layer is preferably a polyethylene film or a polypropylene film. In the foregoing examples, the polyester layer is preferably a PET film. In the foregoing examples, the polyamide layer may be a nylon film.

In view of providing good retort resistance under stress, it is preferable that a multilayer structure of the present invention have a configuration in which base (X)/layer (Z)/layer (Y) are directly stacked. A multilayer structure having a plurality of base (X)/layer (Z)/layer (Y) configurations is preferred because such a structure shows even better gas barrier properties. When a multilayer structure of the present invention uses a plurality of layers having gas barrier properties, it is preferable that at least one base (X)/layer (Z)/layer (Y) configuration be present on the outer side than other gas barrier layers because this can reduce deterioration of the inner gas barrier layers (for example, inorganic deposition layer) due to ambient air (for example, moisture) or other causes.

Applications

A multilayer structure of the present invention has good oxygen barrier properties and good water vapor barrier properties, and is applicable to a wide range of applications, including packaging materials, electronic-device protective sheets, and damp-proof membranes. The preferred use is for packaging materials because a multilayer structure of the present invention has a good appearance and good gas barrier properties even after retorting under stress. Here, a multilayer structure of the present invention having retort resistance under stress can be deemed as being able to maintain a good appearance and good gas barrier properties even after exposure to severe conditions involving stress, meaning that the multilayer structure has excellent durability. Because a multilayer structure of the present invention has excellent durability even in severe external environments in the presence of stress from the reduced pressure inside a packaging material, a multilayer structure of the present invention can be suitably used as an envelope of a vacuum insulator by taking advantage of the foregoing properties. A multilayer structure of the present invention can also maintain excellent gas barrier properties and excellent water vapor barrier properties after a damp heat test, and can be suitably used as a protective sheet for electronic devices.

Packaging Material

A packaging material of the present invention may consists of a multilayer structure of the present invention, or may include a multilayer structure of the present invention and other members.

A packaging material according to a preferred embodiment of the present invention has barrier properties against inorganic gases (such as hydrogen, helium, nitrogen, oxygen, and carbon dioxide), natural gases, water vapor, and organic compounds that are liquid at ordinary temperature and pressure (such as ethanol and gasoline vapor).

When a packaging material of the present invention is in the form of a packaging bag, the multilayer structure may be used over the entirety of the packaging bag or the multilayer structure may be used in a part of the packaging bag. For example, the multilayer structure may constitute 50% to 100% of the overall area of the packaging bag. The same applies to the case where the packaging material is in a form other than a packaging bag (a container or lid, for example).

A packaging material of the present invention can be produced by various methods. For example, a container (packaging material) may be produced by subjecting a sheet of the multilayer structure or a film material including the multilayer structure (such a material will hereinafter be simply referred to as "film material") to a joining process and thereby forming the sheet of the multilayer structure or the film material into a predetermined container shape. Examples of the method for shaping include thermoforming, injection molding, and extrusion blow molding. Alternatively, a container (packaging material) may be produced by forming a layer (Z) and a layer (Y) on a base (X) that has been formed into a predetermined container shape.

A packaging material according to the present invention is preferably used as a food packaging material. A packaging material according to the present invention can be preferably used not only as a food packaging material but also as a packaging material for packaging any of the following: chemicals such as agrochemicals and pharmaceuticals; medical devices; industrial materials such as machinery components and delicate materials; and garments.

Examples of products using a packaging material of the present invention include a vertical form-fill-seal bag, a vacuum packaging bag, a pouch, a laminated tube container, an infusion bag, a container lid, a paper container, a strip tape, an in-mold labeled container, and a vacuum insulator.

The vertical form-fill-seal bag is a bag produced from a multilayer structure of the present invention (film material) using a vertical form-fill-seal machine (or a vertical form-fill-seal packaging machine as it is also called, for example). A vertical form-fill-seal machine forms a bag, for example, by sealing (bonding) the supplied film materials at the sides and the bottom while holding the film materials to form opposing surfaces, and thereby forming a bag with an open top. After filling the bag with contents supplied from above the bag, the vertical form-fill-seal machine seals the top of the bag, and cuts the bag above the seal before discharging it as a vertical form-fill-seal bag.

The vacuum packaging bag is a bag produced from a multilayer structure of the present invention, and is used with a reduced pressure being present inside the bag. Because of the reduced pressure inside the bag, the film material separating the interior of the vacuum packaging bag from outside typically deforms by contacting the contents of the bag. The contents are typically food products such as corn on the cob (corn), beans, bamboo shoots, potatoes, chestnuts, tea leaves, meat, fish, and confectionery.

The pouch is a container that includes a multilayer structure of the present invention (film material) as a barrier by which the interior, where contents are stored, is separated from outside. The pouch is suited for storage of liquid- or slurry-like contents. However, the pouch can also be used to store solid contents. The contents are typically drinks, condiments, liquid foods and other food products, and daily commodities such as detergents and liquid soaps.

The laminated tube container is a container having a body and a discharge portion, where the body is a portion including a multilayer structure of the present invention (laminate film) as a barrier separating the interior of the container from outside, and the discharge portion is a part of tube from which the contents of the container discharge. For example, the body of the laminated tube container has a cylindrical shape with a closed end, and the discharge portion is provided at the other end.

The infusion bag is a bag (container) for storing infusion fluids such as amino acid infusion preparations, electrolyte infusion preparations, carbohydrate infusion preparations, and fat emulsion infusion preparations as contents. The infusion bag may include a plug member, in addition to the body where contents are stored. The infusion bag may have a hanging hole for hanging the bag. In the infusion bag, the film material by which the interior, where infusion fluid is stored, is separated from outside includes a multilayer structure of the present invention.

The container lid includes a film material (a multilayer structure of the present invention) that serves as a part of a barrier that separates the inside and outside of a container by being combined with a container body to form the container. The container lid is combined with the container body so as to seal the opening of the body by heat sealing or by bonding (sealing) with an adhesive, and form a container (a lidded container) having a sealed interior. Typically, the container lid is bonded to the container body at the edges. In this case, a central portion bounded by the edges faces the interior of the container. The body of the container is a shaped body having, for example, a cup or a tray shape, and includes flange and wall portions where the body is sealed to the lid.

The paper container is a container in which the barrier that separates the interior, where contents are stored, from outside includes a paper layer. The paper container is, for example, a gable top or brick container. These shapes have a bottom wall to enable the paper container to stand itself.

The vacuum insulator is a heat insulator including a sheath material, and a core material disposed in the interior bounded by the sheath material. The interior in which the core material is disposed has a reduced pressure. The core material may be, for example, a powder such as a perlite powder, a fiber material such as glass wool, a resin foam such as urethane foam, a hollow container, or a honeycomb structure. In the vacuum insulator, the sheath material that serves as a barrier includes the multilayer structure.

The following examples of layer configurations of a multilayer structure are preferred for vacuum insulators.

(1) Polyolefin layer/ethylene-vinyl alcohol copolymer layer/inorganic deposition layer/polyamide layer/layer (Y)/layer (Z)/polyester layer
(2) Polyolefin layer/inorganic deposition layer/polyester layer/inorganic deposition layer/polyester layer/layer (Y)/layer (Z)/polyester layer
(3) Polyolefin layer/ethylene-vinyl alcohol copolymer layer/inorganic deposition layer/layer (Y)/layer (Z)/polyester layer/layer (Y)/layer (Z)/polyester layer
(4) Polyolefin layer/inorganic deposition layer/polyester layer/layer (Y)/layer (Z)/polyester layer/layer (Y)/layer (Z)/polyester layer
(5) Polyolefin layer/polyamide layer/inorganic deposition layer/polyester layer/layer (Y)/layer (Z)/polyester layer
(6) Polyolefin layer/ethylene-vinyl alcohol copolymer layer/inorganic deposition layer/inorganic deposition layer/polyester layer/layer (Y)/layer (Z)/polyester layer The gas barrier properties improve, and a decrease of thermal conductivity can be reduced by incorporating the inorganic deposition layer. The polyolefin layer may be replaced with a polyethylene-vinyl alcohol copolymer layer. A decrease of thermal conductivity at high temperature can be reduced by replacing the polyolefin layer with an ethylene-vinyl alcohol copolymer layer. When using the foregoing layer configurations as an envelope of a vacuum insulator, it is preferable to arrange the layers in such an orientation that the polyolefin layer is on the inner side (heat sealing layer) and the polyester layer is on the outer side.

The foregoing layer configurations are preferred because long-term deterioration of the inner side due to ambient air such as moisture tends to be reduced. The materials that can be used for the foregoing layer configurations are not particularly limited, and the resins and films described in Examples of the present application can be suitably used.

There are cases where the formed product (for example, a vertical form-fill-seal bag) is heat sealed. For heat sealing, it is typically required to dispose a heat-sealable layer on the inner side of the product to be formed, or on both the inner and outer sides of the product to be formed. Typically, fin sealing is employed for sealing of the body when the heat-sealable layer is present only on the inner side of the product (bag) to be formed, whereas the body is typically sealed in a manner similar to envelope sealing when the heat-sealable layer is present on both the inner and outer sides of the product to be formed. The heat-sealable layer is preferably a polyolefin layer.

An electronic-device protective sheet of the present invention comprises a multilayer structure of the present invention, and may consist only of a multilayer structure of the present invention. The electronic-device protective sheet is used to protect an electronic device from the surrounding environment. For example, a protective sheet of the present invention may be disposed on a surface of the sealing material sealing the body of an electronic device by covering its surface. That is, a protective sheet of the present invention is typically disposed on a surface of the body of an electronic device via a sealing material. The body of an electronic device is not particularly limited, and may be, for example, a photoelectric conversion device, an information display device, or a lighting device.

An electronic-device protective sheet of the present invention may include, for example, a surface protection layer disposed on one or both surfaces of the multilayer structure. It is preferable for the surface protection layer to be a layer made of a scratch-resistant resin. A surface protection layer for a device such as a solar cell which may be used outdoors is preferably made of a resin having high weather resistance (e.g., light resistance). For protecting a surface required to permit transmission of light, a surface protection layer having high light transmissivity is preferred. Examples of the material of the surface protection layer (surface protection film) include poly(meth)acrylic acid ester, polycarbonate, polyethylene terephthalate, polyethylene-2,6-naphthalate, polyvinyl fluoride (PVF), polyvinylidene fluoride (PVDF), polytetrafluoroethylene (PTFE), polychlorotrifluoroethylene (PCTFE), ethylene-tetrafluoroethylene copolymer (ETFE), ethylene-chlorotrifluoroethylene copolymer (ECTFE), tetrafluoroethylene-perfluoroalkyl vinyl ether copolymer (PFA), and tetrafluoroethylene-hexafluoropropylene copolymer (FEP). As an example, the protective sheet includes a poly(meth)acrylic acid ester layer disposed on one surface of the multilayer structure.

An additive (e.g., an ultraviolet absorber) may be added to the surface protection layer to increase the durability of the surface protection layer. A preferred example of the surface protection layer having high weather resistance is an acrylic resin layer to which an ultraviolet absorber has been added. Examples of the ultraviolet absorber include, but are not limited to, ultraviolet absorbers based on benzotriazole, benzophenone, salicylate, cyanoacrylate, nickel, or triazine. These additives may be used with other additives, for example, such as a stabilizer, a light stabilizer, and an antioxidant.

A multilayer laminate of the present invention can also be used as a damp-proof membrane. For example, in decorative sheet applications, a multilayer structure of the present invention may be bonded to the back surface of a decorative sheet used for a room door panel or other applications. In this way, the decorative sheet can be prevented from warping caused by factors such as moisture absorption and desorption due to temperature and humidity changes in a room.

EXAMPLES

The following describes the present invention in greater detail by way of Examples. It should be noted that the present invention is in no way limited by the following Examples, and various changes may be made by a person with ordinary skill in the art within the technical idea of the present invention.

Materials Used in Examples and Comparative Examples

PVA Resin (C)
  C-1: Kuraray Poval® 60-98 (manufactured by Kuraray Co., Ltd., PVA, degree of saponification 98.0 to 99.0 mol %, viscosity (4 mass %, 20° C.) 54.0 to 66.0 mPa·s)
  C-2: Kuraray Poval® 5-98 (manufactured by Kuraray Co., Ltd., PVA, degree of saponification 98.0 to 99.0 mol %, viscosity (4 mass %, 20° C.) 5.2 to 6.0 mPa·s)
  C-3: Kuraray Poval® 5-82 (manufactured by Kuraray Co., Ltd., PVA, degree of saponification 80.0 to 83.0 mol %, viscosity (4 mass %, 20° C.) 4.5 to 5.2 mPa·s)
  C-4: Kuraray Poval® 48-80 (manufactured by Kuraray Co., Ltd., PVA, degree of saponification 78.5 to 80.5 mol %, viscosity (4 mass %, 20° C.) 45.0 to 51.0 mPa·s)
Aqueous dispersion of polyester resin (La)
  La-1: Elitel® KA-5071S (manufactured by Unitika Ltd., polyester-based aqueous dispersion, solids concentration 30 mass %)
  La-2: Pesresin® A-684G (manufactured by Takamatsu Oil and Fat Co., Ltd., an aqueous dispersion of polyester-acryl composite resin, containing about 40% acrylic resin component)
Film
  PET 12: Oriented polyethylene terephthalate film; manufactured by Toray Industries, Inc. under the trade name Lumirror™ P60, thickness=12 μm
  PET 50: Polyethylene terephthalate film with improved adhesion to ethylene-vinyl acetate copolymer; manufactured by TOYOBO CO., LTD. under the trade name SHINEBEAM™ Q1A15, thickness=50 μm
  ONY 15: Oriented nylon film; manufactured by Unitika Ltd. under the trade name EMBLEM™ ONBC, thickness=15 μm
  CPP 50: Non-oriented polypropylene film; manufactured by Mitsui Chemicals Tohcello, Inc. under the trade name RXC-22, thickness=50 μm
  CPP 70: Non-oriented polypropylene film; manufactured by Mitsui Chemicals Tohcello, Inc. under the trade name RXC-22, thickness=70 μm
  CPP 100: Non-oriented polypropylene film; manufactured by Mitsui Chemicals Tohcello, Inc. under the trade name RXC-22, thickness=100 μm
  VM-XL: Aluminum deposited biaxially oriented EVOH; VM-XL, manufactured by Kuraray Co., Ltd., thickness=15 μm, the order of layers is Al deposited layer/EVOH layer, unless otherwise specifically stated Two-component adhesive: TAKELAC®-520 (brand name) and TAKENATE® A-50 (brand name), manufactured by Mitsui Chemicals Inc.

Evaluation Methods (1) Thickness of Layer (Z)

The multilayer structure obtained in each Example and Comparative Example was cut using a focused ion beam (FIB) to prepare a section for cross-sectional observation. The prepared section was secured to a sample stage with a carbon tape, and was subjected to platinum ion sputtering at an accelerating voltage of 30 kV for 30 seconds. The cross-section of the multilayer structure was observed using a field-emission transmission electron microscope, and the thickness of layer (Z) was calculated. The measurement conditions are as follows.

Apparatus: JEM-2100F, manufactured by JEOL Ltd.
Accelerating voltage: 200 kV
Magnification: 250,000×

(2) Retort Test under Stress

Two of the multilayer structures obtained in each Example and Comparative Example were overlaid to face each other on the CPP 50 surfaces, and were heated at 130° C. to form a laminate. After cutting out a 160 mm×40 mm strip from the laminate, a total of 14 holes, each measuring 6 mm in diameter, were formed along the strip in two rows, 7 holes in each row, at 20 mm intervals from the end. The strip was then rolled from the longer side at an 8.5 mm curvature radius, and the ends were secured with a stapler to form a cylindrical shape. The cylinder was subjected to retorting (hot water retaining method) under the following conditions.

Retorting apparatus: Flavor Ace RSC-60, manufactured by HISAKA WORKS, LTD.
Temperature: 125° C.
Time: 30 minutes
Pressure: 0.17 MPaG
After retorting, the cylinder was checked for the presence or absence of peeling around the 6 mm holes, and evaluated as "A" when it had at most 2 peeled holes, "B" when it had 3 to 7 peeled holes, and "C" when it had 8 or more peeled holes.

(3) Oxygen Transmission Rate and Peel Strength after Retorting

The multilayer structure obtained in each Example and Comparative Example was cut into a 120 mm×120 mm size, and heat sealed on three sides to prepare a pouch sealed on three sides. The pouch was then filled with 100 g of water from the non-sealed side, and this side was heat sealed to obtain a pouch containing 100 g of water. The pouch was subjected to retorting (hot water retaining method) under the following conditions.

Retorting apparatus: Flavor Ace RSC-60, manufactured by HISAKA WORKS, LTD.
Temperature: 125° C.
Time: 30 minutes
Pressure: 0.17 MPaG
After retorting, the pouch was cooled to room temperature, and one surface was cut into a 10 mm×10 mm size after wiping off water from the surface.
The cut portion of the pouch was then set on an oxygen transmission rate measurement apparatus in such an orientation that the base (X) was on the carrier gas side, and the oxygen transmission rate was measured by an equal pressure method. The measurement conditions are as follows.

Apparatus: MOCON OX-TRAN 2/21, manufactured by MOCON
Temperature: 20° C.
Humidity on oxygen feed side: 85% RH
Humidity on carrier gas side: 85% RH
Carrier gas flow rate: 10 mL/min
Oxygen pressure: 1.0 atm
Carrier gas pressure: 1.0 atm
Immediately after retorting, the multilayer structure was cut out from the pouch, and subjected to a T-peel strength measurement according to JIS K 6854-3:1999 (adhesion per 15 mm width) to measure wet-state interlayer peel strength. The measurement was conducted 5 times, and the mean value was calculated. Here, "wet-state interlayer peel strength" refers to a peel strength between layers measured soon after wiping off surface water immediately following retorting. The measurement conditions are as follows.

Apparatus: Autograph AGS-H, Shimadzu Corporation
Peel rate: 250 mm/min
Temperature: 23° C.
Humidity: 50% RH
Separately, a wetted interlayer peel strength was measured in the same fashion by conducting the same peel strength measurement, except that the peel strength was measured while dropping ion-exchange water on the delaminating interface with a dropper.

Production Example of Coating Liquid (R-1

A PVA Kuraray Poval® 60-98 (4.8 parts by mass) and water (95.2 parts by mass) were mixed, and the mixture was stirred in an 80° C. water bath for 5 hours to dissolve the Kuraray Poval® 60-98 and obtain a PVA aqueous solution (1-1). Thereafter, 0.8 parts by mass of polyester-based aqueous dispersion Elitel® KA-5071S (manufactured by Unitika Ltd.), 1.2 parts by mass of PVA aqueous solution (1-1), 68.1 parts by mass of water, and 29.9 parts by mass of methanol were mixed, and the mixture was stirred for 1 hour to obtain a coating liquid (R-1).

Production Example of Coating Liquid (R-2)

A coating liquid (R-2) was obtained in the same manner as in Production Example of coating liquid (R-1), except that Kuraray Poval® 5-98 was used instead of Kuraray Poval® 60-98.

Production Example of Coating Liquid (R-3)

A PVA Kuraray Poval® 5-82 (4.8 parts by mass) and water (95.2 parts by mass) were mixed, and the mixture was stirred at room temperature for 5 hours to dissolve the Kuraray Poval® 5-82 and obtain a PVA aqueous solution (1-2). Thereafter, 0.8 parts by mass of polyester-based aqueous dispersion Elitel® KA-5071S (manufactured by Unitika Ltd.), 1.2 parts by mass of PVA aqueous solution (1-2), 68.1 parts by mass of water, and 29.9 parts by mass of methanol were mixed, and the mixture was stirred for 1 hour to obtain a coating liquid (R-3).

Production Example of Coating Liquid (R-4)

A coating liquid (R-4) was obtained in the same manner as in Production Example of coating liquid (R-3), except that Kuraray Poval® 48-80 was used instead of Kuraray Poval® 5-82.

Production Example of Coating Liquid (R-5)

A PVA Kuraray Poval® 60-98 (4.8 parts by mass) and water (95.2 parts by mass) were mixed, and the mixture was stirred in an 80° C. water bath for 5 hours to dissolve the Kuraray Poval® 60-98 and obtain a PVA aqueous solution (1-1). Thereafter, 2.2 parts by mass of ester-based aqueous dispersion Pesresin A-684G (manufactured by Takamatsu Oil and Fat Co., Ltd.), 1.2 parts by mass of PVA aqueous solution (1-1), 66.8 parts by mass of water, and 29.8 parts by mass of methanol were mixed, and the mixture was stirred for 1 hour to obtain a coating liquid (R-5).

Production Example of Coating Liquid (R-6)

A coating liquid (R-6) was obtained in the same manner as in Production Example of coating liquid (R-5), except that Kuraray Poval® 5-98 was used instead of Kuraray Poval® 60-98.

Production Example of Coating Liquid (R-7)

A PVA Kuraray Poval® 5-82 (4.8 parts by mass) and water (95.2 parts by mass) were mixed, and the mixture was stirred at room temperature for 5 hours to dissolve the Kuraray Poval® 5-82 and obtain a PVA aqueous solution (1-2). Thereafter, 2.2 parts by mass of ester-based aqueous dispersion Pesresin A-684G (manufactured by Takamatsu Oil and Fat Co., Ltd.), 1.2 parts by mass of PVA aqueous solution (1-2), 66.8 parts by mass of water, and 29.8 parts by mass of methanol were mixed, and the mixture was stirred for 1 hour to obtain a coating liquid (R-7).

Production Example of Coating Liquid (R-8)

A coating liquid (R-8) was obtained in the same manner as in Production Example of coating liquid (R-7), except that Kuraray Poval® 48-80 was used instead of Kuraray Poval® 5-82.

Production Example of Coating Liquid (CR-1)

A polyester-based aqueous dispersion Elitel® KA-5071S (1.0 part by mass; manufactured by Unitika Ltd.), water (69.0 parts by mass), and methanol (30.0 parts by mass) were mixed, and the mixture was stirred for 1 hour to obtain a coating liquid (CR-1).

Production Example of Coating Liquid (CR-2)

An ester-based aqueous dispersion Pesresin A-684G (2.4 parts by mass; manufactured by Takamatsu Oil and Fat Co., Ltd.), water (67.8 parts by mass), and methanol (29.8 parts by mass) were mixed, and the mixture was stirred for 1 hour to obtain a coating liquid (CR-2).

Production Example of Coating Liquid (CR-3)

A PVA Kuraray Poval® 60-98 (4.8 parts by mass) and water (95.2 parts by mass) were mixed, and the mixture was stirred in an 80° C. water bath for 5 hours to dissolve the Kuraray Poval® 60-98 and obtain a PVA aqueous solution (1-1). Thereafter, 0.3 parts by mass of PVA aqueous solution (1-1), 69.8 parts by mass of water, and 29.9 parts by mass of methanol were mixed, and the mixture was stirred for 1 hour to obtain a coating liquid (CR-3).

Production Example of Coating Liquid (CR-4)

A coating liquid (CR-4) was obtained in the same manner as in Production Example of coating liquid (CR-3), except that Kuraray Poval® 5-98 was used instead of Kuraray Poval® 60-98.

Production Example of Coating Liquid (CR-5)

A PVA Kuraray Poval® 5-82 (4.8 parts by mass) and water (95.2 parts by mass) were mixed, and the mixture was stirred at room temperature for 5 hours to dissolve the Kuraray Poval® 5-82 and obtain a PVA aqueous solution (1-2). Thereafter, 0.3 parts by mass of PVA aqueous solution (1-2), 69.8 parts by mass of water, and 29.9 parts by mass of methanol were mixed, and the mixture was stirred for 1 hour to obtain a coating liquid (CR-5).

Production Example of Coating Liquid (CR-6)

A coating liquid (CR-6) was obtained in the same manner as in Production Example of coating liquid (CR-5), except that Kuraray Poval® 48-80 was used instead of Kuraray Poval® 5-82.

Production Example of Coating Liquid (S-1)

Distilled water in an amount of 230 parts by mass was heated to 70° C. under stirring. Triisopropoxyaluminum in an amount of 88 parts by mass was added dropwise to the distilled water over 1 hour, the liquid temperature was gradually increased to 95° C., and isopropanol generated was distilled off. In this manner, hydrolytic condensation was performed. To the resulting liquid was added 4.0 parts by mass of a 60 mass % aqueous nitric acid solution, and this was followed by stirring at 95° C. for 3 hours to deflocculate agglomerates of particles of the hydrolytic condensate. After that, the liquid was concentrated so that the concentration of solids calculated as aluminum oxide was adjusted to 10 mass %. To 22.50 parts by mass of the solution thus obtained were added 54.29 parts by mass of distilled water and 18.80 parts by mass of methanol. This was followed by stirring to obtain a homogeneous dispersion. Subsequently, 4.41 parts by mass of an 85 mass % aqueous phosphoric acid solution was added dropwise to the dispersion under stirring, with the liquid temperature held at 15° C. The stirring was continued at 15° C. until a viscosity of 1,500 mPa·s was reached. The intended coating liquid (S-1) was thus obtained. In the coating liquid (S-1), the molar ratio between aluminum atoms and phosphorus atoms, as expressed by [aluminum atoms]:[phosphorus atoms], was 1.15:1.00.

Example 1

Example 1-1

First, a PET 12 (which may hereinafter be abbreviated as "X-1") was prepared as the base (X). The coating liquid (R-1) was applied onto the base with a bar coater in a thickness that becomes 10 nm after drying. The film of the applied liquid was dried at 140° C. for 1 minute to form a layer (Z-1) on the base. Thereafter, the coating liquid (S-1) was applied with a bar coater in a thickness that becomes 0.3 μm after drying. The film of the applied liquid was dried at 120° C. for 3 minutes to form a precursor of layer (Y-1) on the layer (Z-1). This produced a structure having a configuration of base (X-1)/layer (Z-1)/a precursor of layer (Y-1).

The structure was heat treated at 180° C. for 1 minute to form a layer (Y-1). This produced a multilayer structure (1-1-1) having a configuration of base (X-1)/layer (Z-1)/layer (Y-1). Thereafter, an adhesive layer was formed on the layer (Y) of the multilayer structure (1-1-1), and an ONY15 was laminated on the adhesive layer to form a laminate. After forming another adhesive layer on the ONY 15, a CPP 50 was laminated on the adhesive layer, and the laminate was left to stand at 40° C. for 5 days for aging. This produced a multilayer structure (1-1-2) having a configuration of base (X)/layer (Z)/layer (Y)/adhesive layer/ONY/adhesive layer/CPP. Each of the two adhesive layers was formed by applying the two-component adhesive (TAKE-LAC® and TAKENATE®) with a bar coater in a thickness that becomes 3 μm after drying, and drying the adhesive. The multilayer structure (1-1-2) was measured for thickness of layer (Z), retort resistance under stress, and post-retort oxygen transmission rate and peel strength according to the evaluation methods (1) to (3) described above. The evaluation results are presented in Table 1.

Examples 1-2 to 1-16 and Comparative Examples 1-1 to 1-7

Multilayer structures (1-2-2) to (1-16-2) and multilayer structures (C1-1-2) to (C1-7-2) were produced and evaluated in the same manner as in Example 1-1, except that the type of coating liquid and the thickness of layer (Z) were varied as shown in Table 1. The results are presented in Table 1.

Comparative Examples 1-8

Multilayer structures (C1-8-1) and (C1-8-2) were produced and evaluated in the same manner as in Example 1-1, except that a deposited layer of aluminum, 0.08 m thick, was used as layer (Y). The results are presented in Table 1.

TABLE 1

| | Multilayer structure No. | Layer (Z) Coating liquid (R) | Thickness of layer (Z) (nm) | PVA resin (C) | Aqueous dispersion of polyester resin (La) | Blend ratio: Resin (C)/resin(L) | Viscosity of resin (C) at 4 mass %, 20° C. (mPa · s) |
|---|---|---|---|---|---|---|---|
| Ex. 1-1 | 1-1-2 | R-1 | 10 | 60-98 | Elitel KA5071S | 20/80 | 60 |
| Ex. 1-2 | 1-2-2 | R-2 | 10 | 5-98 | Elitel KA5071S | 20/80 | 5 |
| Ex. 1-3 | 1-3-2 | R-3 | 10 | 5-82 | Elitel KA5071S | 20/80 | 5 |
| Ex. 1-4 | 1-4-2 | R-4 | 10 | 48-80 | Elitel KA5071S | 20/80 | 48 |
| Ex. 1-5 | 1-5-2 | R-5 | 10 | 60-98 | Pesresin A-684G | 20/80 | 60 |
| Ex. 1-6 | 1-6-2 | R-6 | 10 | 5-98 | Pesresin A-684G | 20/80 | 5 |
| Ex. 1-7 | 1-7-2 | R-7 | 10 | 5-82 | Pesresin A-684G | 20/80 | 5 |
| Ex. 1-8 | 1-8-2 | R-8 | 10 | 48-80 | Pesresin A-684G | 20/80 | 48 |
| Ex. 1-9 | 1-9-2 | R-8 | 5 | 48-80 | Pesresin A-684G | 20/80 | 48 |
| Ex. 1-10 | 1-10-2 | R-8 | 50 | 48-80 | Pesresin A-684G | 20/80 | 48 |
| Ex. 1-11 | 1-11-2 | R-8 | 100 | 48-80 | Pesresin A-684G | 20/80 | 48 |
| Ex. 1-12 | 1-12-2 | R-4 | 5 | 48-80 | Elitel KA5071S | 20/80 | 48 |
| Ex. 1-13 | 1-13-2 | R-4 | 50 | 48-80 | Elitel KA5071S | 20/80 | 48 |
| Ex. 1-14 | 1-14-2 | R-4 | 100 | 48-80 | Elitel KA5071S | 20/80 | 48 |
| Ex. 1-15 | 1-15-2 | R-4 | 10 | 48-80 | Elitel KA5071S | 3/97 | 48 |
| Ex. 1-16 | 1-16-2 | R-4 | 10 | 48-80 | Elitel KA5071S | 45/55 | 48 |
| Com. Ex. 1-1 | C1-1-2 | — | — | — | — | — | — |
| Com. Ex. 1-2 | C1-2-2 | CR-1 | 10 | — | Elitel KA5071S | — | — |
| Com. Ex. 1-3 | C1-3-2 | CR-2 | 10 | — | Pesresin A-684G | — | — |
| Com. Ex. 1-4 | C1-4-2 | CR-3 | 10 | 60-98 | — | — | 60 |
| Com. Ex. 1-5 | C1-5-2 | CR-4 | 10 | 5-98 | — | — | 5 |
| Com. Ex. 1-6 | C1-6-2 | CR-5 | 10 | 5-82 | — | — | 5 |
| Com. Ex. 1-7 | C1-7-2 | CR-6 | 10 | 48-80 | — | — | 48 |
| Com. Ex. 1-8 | C1-8-2 | R-4 | 10 | 48-80 | Elitel KA5071S | 20/80 | 48 |

TABLE 1-continued

|  | Layer (Y) Coating liquid (S) | Appearance after retorting under stress | Peel strength after retorting | | Oxygen transmission rate after retorting (cc/m² · day · atm) |
|---|---|---|---|---|---|
|  |  |  | Wet [1] (gf/15 mm) | Wetted [2] (gf/15 mm) |  |
| Ex. 1-1 | S-1 | A | 500 | 290 | 0.1 |
| Ex. 1-2 | S-1 | A | 490 | 270 | 0.2 |
| Ex. 1-3 | S-1 | A | 500 | 280 | 0.2 |
| Ex. 1-4 | S-1 | A | 520 | 300 | 0.1 |
| Ex. 1-5 | S-1 | A | 510 | 290 | 0.2 |
| Ex. 1-6 | S-1 | A | 500 | 280 | 0.2 |
| Ex. 1-7 | S-1 | A | 490 | 290 | 0.2 |
| Ex. 1-8 | S-1 | A | 520 | 300 | 0.1 |
| Ex. 1-9 | S-1 | A | 520 | 300 | 0.1 |
| Ex. 1-10 | S-1 | A | 500 | 270 | 0.2 |
| Ex. 1-11 | S-1 | B | 490 | 250 | 0.3 |
| Ex. 1-12 | S-1 | A | 520 | 300 | 0.1 |
| Ex. 1-13 | S-1 | A | 500 | 270 | 0.2 |
| Ex. 1-14 | S-1 | A | 480 | 240 | 0.3 |
| Ex. 1-15 | S-1 | B | 490 | 270 | 0.6 |
| Ex. 1-16 | S-1 | A | 420 | 190 | 0.2 |
| Com. Ex. 1-1 | S-1 | C | 530 | 260 | 0.2 |
| Com. Ex. 1-2 | S-1 | C | 480 | 270 | 6.1 |
| Com. Ex. 1-3 | S-1 | C | 470 | 270 | 5.7 |
| Com. Ex. 1-4 | S-1 | A | 230 | <10 | 0.3 |
| Com. Ex. 1-5 | S-1 | A | 210 | <10 | 0.4 |
| Com. Ex. 1-6 | S-1 | A | 230 | <10 | 0.5 |
| Com. Ex. 1-7 | S-1 | A | 240 | <10 | 0.3 |
| Com. Ex. 1-8 | — (Aluminum deposited layer) | A | 470 | <10 | 6.0 |

[1] Peel strength between layers measured soon after wiping off surface water immediately following retorting
[2] Peel strength between base (X) and layer (Y) measured while dropping ion-exchange water on delaminating interface with a dropper Example 2: Vertical Form-Fill-Seal Bag Example 2-1

An adhesive layer was formed on the multilayer structure (1-1-1) produced in Example 1-1, and an ONY 15 was laminated on the adhesive layer to form a laminate. After forming another adhesive layer on the ONY of the laminate, a CPP 70 was laminated on the adhesive layer, and the laminate was left to stand at 40° C. for 5 days for aging. This produced a multilayer structure (2-1-1). Each of the two adhesive layers was formed by applying the two-component adhesive with a bar coater in a thickness that becomes 3 μm after drying, and drying the adhesive. After cutting the multilayer structure (2-1-1) into sheets of 400 mm width, the sheets were fed to a vertical form-fill-seal packaging machine (manufactured by ORIHIRO Co., Ltd.), and heat sealed on the CPP layers contacting each other. The vertical form-fill-seal packaging machine produced a fin-sealed vertical form-fill-seal bag (2-1-2) (width 160 mm, length 470 mm). The vertical form-fill-seal bag (2-1-2) was heat sealed to form a pouch, and 300 mL of water was filled into the pouch. A retort test conducted for the pouch under the following conditions showed that the pouch retained a good appearance with no breakage or delamination.

Retort Test
Retorting apparatus: Flavor Ace RSC-60, manufactured by HISAKA WORKS, LTD.
Temperature: 125° C.
Time: 30 minutes
Pressure: 0.17 MPaG Example 3: Flat Pouch Example 3-1

The multilayer structure (2-1-1) produced in Example 2-1 was cut into two 120 mm×120 mm sheets, and the two sheets of multilayer structure were overlaid in such an orientation that the CPP layers were on the inner side. The resulting rectangular laminate was heat sealed on three sides to form a flat pouch (3-1-1). The flat pouch was then filled with 100 mL of water. A retort test conducted for the flat pouch under the same conditions used in Example 2-1 showed that the pouch retained a good appearance with no breakage or delamination.

Example 4: Infusion Bag

Example 4-1

Two 120 mm×100 mm sheets of multilayer structure were cut out from the multilayer structure (2-1-1) produced in Example 2-1. The two sheets of multilayer structure were then overlaid in such an orientation that the CPP layers were on the inner side. The periphery of the resulting laminate was heat sealed, and a spout (plug member) made of polypropylene was attached by heat sealing. This produced an infusion bag (4-1-1). After filling 100 mL of water into the infusion bag (4-1-1), a retort test was conducted under the same conditions used in Example 2-1. The infusion bag retained a good appearance with no breakage or delamination.

Example 5: Container Lid

Example 5-1

A 100 mm-diameter circular piece of multilayer structure was cut out from the multilayer structure (2-1-1) produced in Example 2-1, and was used as a container lid. Separately, a flanged container (Hi-Retoflex® HR78-84 manufactured by Toyo Seikan Co., Ltd. under this trade name) was prepared for use as a container body. This product is a cup-shaped container measuring 30 mm in height and 78 mm in diameter at the top. The container has an open top, and the flange portion formed along the periphery of the open top is 6.5 mm wide. The container is configured as a three-layer laminate of olefin layer/steel layer/olefin layer. The container was filled almost full with water, and the lid was heat sealed to the flange portion to obtain a lidded container (5-1-1). For heat sealing, the lid was disposed in such an orientation that the CPP layer of the lid was in contact with the flange portion. A retort test conducted for the lidded container (5-1-1) under the same conditions used in Example 2-1 showed that the lidded container retained a good appearance with no breakage or delamination.

Example 6: In-Mold Labeled Container

Example 6-1

A two-component adhesive was applied to two sheets of CPP 100 with a bar coater in a thickness that becomes 3 μm after drying on each sheet, and the adhesive was dried. Here, the two-component adhesive is a two-component reactive polyurethane adhesive composed of TAKELAC©A-525S and TAKENATE©A-50 (both manufactured by Mitsui Chemicals, Inc.). The two CPP sheets were laminated with the multilayer structure (1-1-1) of Example 1-1, and the resulting laminate was allowed to stand at 40° C. for 5 days for aging. This produced a multilayer label (6-1-1) having a configuration of CPP/adhesive layer (I)/base (X-1)/layer (Z-1)/layer (Y-1)/adhesive layer (1)/CPP.

The multilayer label (6-1-1) was cut to conform to the shape of the inner wall surface of a female mold member of a mold for forming a container, and attached to the inner wall surface of the female mold member. After pressing a male mold member into the female mold member, molten polypropylene (NOVATEC® EA7A manufactured by Japan Polypropylene Corporation) was injected into the cavity between the male mold member and female mold member at 220° C. The injection molding produced a container (6-1-2) as intended. The container body had a thickness of 700 m and a surface area of 83 cm$^2$. The entire exterior of the container was covered with the multilayer label (6-1-1) overlying the seams, leaving no exterior area that was not covered by the multilayer label (6-1-1). The container (6-1-2) had a good appearance.

Example 7: Extrusion Coating Lamination

Example 7-1

An adhesive layer was formed on the layer (Y) of the multilayer structure (1-1-1) of Example 1-1, and a polyethylene resin (having a density of 0.917 g/cm$^3$ and a melt flow rate of 8 g/10 min) was applied on the adhesive layer by extrusion coating lamination at 295° C. to form a layer having a thickness of 20 μm. This produced a laminate (7-1-1) having a configuration of base (X-1)/layer (Z-1)/layer (Y-1)/adhesive layer (1)/polyethylene layer. The adhesive layer (1) was formed by applying a two-component adhesive with a bar coater in a thickness that becomes 0.3 m after drying, and drying the adhesive. Here, the two-component adhesive is a two-component reactive polyurethane adhesive composed of TAKELAC® A-3210 and TAKENATE® A-3070 (both manufactured by Mitsui Chemicals, Inc.). A retort test conducted for the laminate (7-1-1) under the same conditions used in Example 2-1 showed that the laminate retained a good appearance with no delamination.

Example 8: Influence of Packaged Material

Example 8-1

The flat pouch (3-1-1) produced in Example 3-1 was filled with 500 mL of a 1.5% aqueous solution of ethanol, and was subjected to a retort test under the same conditions used in Example 2-1. The pouch retained a good appearance with no delamination.

Examples 8-2 to 8-9

A retort test was conducted in the same manner as in Example 8-1, except that 500 mL of various materials was filled into the flat pouch(3-1-1), instead of 500 mL of a 1.5% aqueous solution of ethanol. After testing, a measurement sample was cut out from the flat pouch, and the oxygen transmission rate of the sample was measured. The packaged materials are a 1.0% aqueous solution of ethanol (Example 8-2), vinegar (Example 8-3), an aqueous solution of citric acid with a pH of 2 (Example 8-4), an edible oil (Example 8-5), ketchup (Example 8-6), soy sauce (Example 8-7), and a ginger paste (Example 8-8). All of these samples had an oxygen transmission rate of 0.2 cc/(m$^2$·day·atm) after the retort test. In another retort test conducted in the same manner as in Example 8-1, the lidded container (5-1-1) produced in Example 5-1 was tested with mandarin syrup filling the container almost completely (Example 8-9). The tested lidded container retained a good appearance with no delamination.

As clearly demonstrated in Examples 8-1 to 8-9, the packaging materials of the present invention retained a good appearance even after the retort tests conducted with various food products.

Example 9: Vacuum Insulator

Example 9-1

The two-component adhesive used in Example 6-1 was applied on a CPP 50 in a thickness that becomes 3 μm after drying, and the adhesive was dried to form an adhesive layer. The CPP 50 was then bonded to the PET layer of the multilayer structure (2-1-1) produced in Example 2-1. This produced a laminate (9-1-1) having a configuration of CPP/adhesive layer (I)/base (X-1)/layer (Z-1)/layer (Y-1)/adhesive layer (I)/ONY/adhesive layer (I)/CPP. Separately, the same two-component reactive polyurethane adhesive was applied on an ONY15 have a thickness of 3 m after drying, and the adhesive was dried to form an adhesive layer. The ONY 15 was then bonded to the laminate (9-1-1) to obtain a multilayer structure (9-1-2) having a configuration of CPP/adhesive layer (I)/laminate (9-1-1)/adhesive layer (I)/ONY.

The multilayer structure (9-1-2) was cut into two laminates, each measuring 700 mm×300 mm in size. The laminates were overlaid in such an orientation that the CPP layers were on the inner side. These were then heat sealed on three sides with a seal width of 10 mm. This produced a bag sealed on three sides. Thereafter, a heat-insulating core material was filled into the bag through its opening, and the bag was hermetically closed with a vacuum packaging machine at 20° C. with an internal pressure of 10 Pa. This produced a vacuum insulator (9-1-3). A fine silica powder was used as the heat-insulating core material. The vacuum insulator (9-1-3) was left at 40° C., 15% RH for 360 days, and the internal pressure of the vacuum insulator was measured using a Pirani gauge. The measured pressure was 37.0 Pa.

Example 9-2

The two-component adhesive used in Example 6-1 was applied on a CPP 50 in a thickness that becomes 3 μm after drying, and the adhesive was dried to form an adhesive layer. The CPP 50 was then bonded to VM-XL to obtain a laminate (9-2-1) having a configuration of VM-XL/adhesive layer/CPP 50. Separately, the same two-component reactive polyurethane adhesive was applied on the layer (Y-1) of the multilayer structure (1-1-1) of Example 1-1 in a thickness that becomes 3 m after drying, and the adhesive was dried to form an adhesive layer. The multilayer structure (1-1-1) was then bonded to the laminate (9-2-1) to obtain a multilayer structure (9-2-2) having a configuration of base (X-1)/layer (Z-1)/layer (Y-1)/adhesive layer/VM-XL/adhesive layer/CPP 50. In the same manner, another multilayer structure (1-1-1) was bonded to obtain a multilayer structure (9-2-3) having a configuration of base (X-1)/layer (Z-1)/layer (Y-1)/adhesive layer/base (X-1)/layer (Z-1)/layer (Y-1)/adhesive layer/VM-XL/adhesive layer/CPP 50. The multilayer structure (9-2-3) was cut into two laminates, each measuring 700 mm×300 mm in size. The laminates were overlaid in such an orientation that the CPP layers were on the inner side. These were then heat sealed on three sides with a seal width of 10 mm. This produced a bag sealed on three sides. Thereafter, a heat-insulating core material was filled into the bag through its opening, and the bag was hermetically closed with a vacuum packaging machine at 20° C. with an internal pressure of 10 Pa. This produced a vacuum insulator (9-2-4). A fine silica powder was used as the heat-insulating core material. The vacuum insulator (9-2-4) was left at 40° C., 15% RH for 360 days, and the internal pressure of the vacuum insulator was measured using a Pirani gauge. The measured pressure was 28.0 Pa.

Example 10-1

An adhesive layer was formed on the multilayer structure (1-1-1) produced in Example 1-1, and an acrylic resin film (thickness: 50 μm) was laminated on the adhesive layer to obtain a laminate. Thereafter, another adhesive layer was formed on the base (X-1) of the multilayer structure (1-1-1) of the laminate, and a PET 50 was laminated on the laminate. This produced a protective sheet (10-1-1) having a configuration of PET/adhesive layer (I)/base (X-1)/layer (Z-1)/layer (Y-1)/adhesive layer (I)/acrylic resin film. Each of the two adhesive layers was formed by applying the two-component adhesive in a thickness that becomes 3 μm after drying, and drying the adhesive. The two-component adhesive is a two-component reactive polyurethane adhesive composed of TAKELAC® A-1102 and TAKENATE® A-3070 (both manufactured by Mitsui Chemicals, Inc.).

The protective sheet (10-1-1) was subjected to a durability test (damp heat test). In the test, the protective sheet was stored in an 85° C., 85% RH atmosphere under atmospheric pressure for 1,000 hours using a thermo-hygrostat. The protective sheet retained a good appearance with no delamination.

The invention claimed is:

1. A multilayer structure comprising a base (X), a layer (Z) stacked on the base (X), and a layer (Y) stacked on the layer (Z),
   the layer (Y) containing a reaction product (D) of an aluminum-containing metal oxide (A) and an inorganic phosphorus compound (BI),
   the layer (Z) containing a water-soluble polyvinyl alcohol resin (C) and a polyester resin (L),
   wherein a mass ratio (C)/(L) of the water-soluble polyvinyl alcohol resin (C) and the polyester resin (L) is 1/99 to 45/55.

2. The multilayer structure according to claim 1, wherein the polyester resin (L) is a polyester resin having a carboxyl group.

3. The multilayer structure according to claim 2, wherein the layer (Z) has a thickness ranging from 1 to 100 nm, a degree of saponification of the water-soluble polyvinyl alcohol resin is 70 mol % or more and 99.9 mol % or less, the base (X) includes polyethylene terephthalate, the aluminum-containing metal oxide (A) includes at least one hydrolytic condensate of a compound (E) that includes a metal atom (M) and an optionally substituted alkoxy group having 1 to 9 carbon atoms bonded to the metal atom (M), and the inorganic phosphorus compound (BI) includes a phosphorus oxoacid.

4. The multilayer structure according to claim 1, wherein the water-soluble polyvinyl alcohol resin (C) has a viscosity in a 4 mass % aqueous solution of 1 mPa·s to 100 mPa·s as measured in accordance with JIS K 6726 (1994).

5. The multilayer structure according to claim 1, wherein the layer (Z) has a thickness ranging from 1 to 100 nm.

6. The multilayer structure according to claim 1, wherein the base (X) and the layer (Y) have an interlayer peel strength of 100 gf/15 mm or more as measured while dropping water on a delaminating interface after 125° C., 30-minute retorting.

7. A method for producing the multilayer structure of claim 1, comprising:
   a step (I) of applying a coating liquid (R) containing the water-soluble polyvinyl alcohol resin (C), the polyester resin (La), and a solvent to the base (X), and removing the solvent to form the layer (Z);
   a step (II) of applying a coating liquid (S) containing the aluminum-containing metal oxide (A), the inorganic phosphorus compound (BI), and a solvent to the layer (Z), and removing the solvent to form a precursor of layer (Y); and a step (III) of heat treating the precursor of layer (Y) to form a layer (Y).

8. The method of claim 7, further comprising, before the step (I), dissolving the water-soluble polyvinyl alcohol resin (C) in water to form an aqueous solution.

9. The method of claim 8, further comprising, mixing the aqueous solution with the polyester resin (La) to form the coating liquid (R).

10. A packaging material comprising the multilayer structure of claim 1.

11. The packaging material according to claim 10, which is a vertical form-fill-seal bag, a vacuum packaging bag, a pouch, a laminated tube container, an infusion bag, a paper container, a strip tape, a container lid, or an in-mold labeled container.

12. A product using the packaging material of claim 10 in at least a part of the product.

13. The product according to claim 12, wherein
the product comprises contents in an interior thereof,
the contents are a core material,
the interior of the product has a reduced pressure, and
the product functions as a vacuum insulator.

14. A protective sheet for electronic devices, comprising the multilayer structure of claim 1.

15. An electronic device comprising the protective sheet of claim 14.

16. The multilayer structure according to claim 1, wherein the aluminum-containing metal oxide (A) includes at least one hydrolytic condensate of a compound (E) that includes a metal atom (M) and a characteristic group bonded to the metal atom (M), the characteristic group is selected from the group consisting of a halogen atom, nitrate, an optionally substituted alkoxy group having 1 to 9 carbon atoms, an optionally substituted aryloxy group having 6 to 9 carbon atoms, an optionally substituted acyloxy group having 2 to 9 carbon atoms, an optionally substituted alkenyloxy group having 3 to 9 carbon atoms, an optionally substituted P-diketonato group having 5 to 15 carbon atoms, and a diacylmethyl group having an optionally substituted acyl group having 1 to 9 carbon atoms.

17. The multilayer structure according to claim 1, wherein the inorganic phosphorus compound (BI) includes at least one selected from the group consisting of a phosphorus oxoacid, a salt of the phosphorus oxoacid, and a derivative of the phosphorus oxoacid.

18. The multilayer structure according to claim 1, wherein the water-soluble polyvinyl alcohol resin (C) includes at least one selected from the group consisting of an unmodified or modified polyvinyl alcohol resin and an unmodified or modified ethylene-vinyl alcohol copolymer resin.

19. The multilayer structure according to claim 1, wherein the polyester resin (L) includes at least one reaction product between a polyvalent carboxylic acid and a polyol, the polyvalent carboxylic acid includes at least one selected from the group consisting of terephthalic acid, isophthalic acid, o-phthalic acid, 2,6-naphthalene dicarboxylic acid, p-phenylene carboxylic acid, 1,4-cyclohexane dicarboxylic acid, succinic acid, glutaric acid, adipic acid, suberic acid, azelaic acid, sebacic acid, dodecanedioic acid, trimellitic acid, pyromellitic acid, and sodium sulfoisophthalate, and the polyol includes at least one selected from the group consisting of ethylene glycol, 1,2-propylene glycol, 1,4-butanediol, 1,5-pentanediol, 1,6-hexanediol, neopentyl glycol, diethylene glycol, triethylene glycol, polyethylene glycol, polytetramethylene glycol, 1,4-cyclohexane dimethanol, trimethylolpropane, pentaerythritol, and ethylene oxide adducts of bisphenol A.

20. The multilayer structure according to claim 1, wherein the layer (Z) further includes an acrylic resin.

* * * * *